United States Patent
Luo

(10) Patent No.: US 10,429,980 B2
(45) Date of Patent: Oct. 1, 2019

(54) DISPLAY PANEL AND DISPLAY DEVICE

(71) Applicant: Xiamen Tianma Micro-Electronics Co., Ltd., Xiamen (CN)

(72) Inventor: Xiaodong Luo, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/996,717

(22) Filed: Jun. 4, 2018

(65) Prior Publication Data

US 2019/0235676 A1 Aug. 1, 2019

(30) Foreign Application Priority Data

Jan. 31, 2018 (CN) .......................... 2018 1 0093767

(51) Int. Cl.
| | |
|---|---|
| *G06F 3/041* | (2006.01) |
| *G06F 3/044* | (2006.01) |
| *G02F 1/1362* | (2006.01) |
| *G02F 1/1333* | (2006.01) |
| *G02F 1/1343* | (2006.01) |

(52) U.S. Cl.
CPC ........ *G06F 3/0412* (2013.01); *G02F 1/13338* (2013.01); *G02F 1/133345* (2013.01); *G02F 1/134309* (2013.01); *G02F 1/136286* (2013.01); *G06F 3/044* (2013.01); *G02F 2001/134345* (2013.01); *G02F 2201/123* (2013.01); *G06F 2203/04102* (2013.01); *G06F 2203/04111* (2013.01)

(58) Field of Classification Search
CPC ......... G02F 1/133345; G02F 1/134309; G02F 1/13338; G02F 1/136286; G02F 2201/123; G02F 2001/134345; G06F 3/0412; G06F 3/044; G06F 2203/04111; G06F 2203/04102
See application file for complete search history.

(56) References Cited

U.S. PATENT DOCUMENTS

| | | | | |
|---|---|---|---|---|
| 2018/0095314 | A1* | 4/2018 | Cheng | ................ G09G 3/3655 |
| 2018/0356664 | A1* | 12/2018 | Yang | ................ G02F 1/134309 |
| 2018/0373079 | A1* | 12/2018 | Yeh | ...................... G02F 1/13338 |
| 2019/0102012 | A1* | 4/2019 | Shi | ........................ G06F 3/0446 |

* cited by examiner

*Primary Examiner* — Muhammad N Edun
(74) *Attorney, Agent, or Firm* — Tarolli, Sundheim, Covell & Tummino LLP

(57) ABSTRACT

A display panel and a display device. The display panel includes sub-pixels, an insulation layer including a first via hole, a flat layer including a second via hole, and a touch electrode including a third via hole overlapping the first via hole, the edge of each touch electrode in the first direction is between adjacent sub-pixels, each first sub-pixel is adjacent to the edge of the touch electrode; in the first direction, a center point of the first via hole is deviated by more than 1 μm away from a first edge relative to a center point of the second via hole, a center point of the third via hole is deviated by more than 1 μm away from the first edge relative to the center point of the second via hole, and the first edge is an edge of a closest touch electrode to the first sub-pixel in the first direction.

17 Claims, 21 Drawing Sheets

DISPLAY PANEL AND DISPLAY DEVICE

CROSS-REFERENCE TO RELATED APPLICATIONS

The present application claims priority to Chinese Patent Application No. 201810093767.1, filed on Jan. 31, 2018, the content of which is incorporated herein by reference in its entirety.

TECHNICAL FIELD

The present disclosure relates to the technical field of display technologies and, particularly, relates to a display panel and a display device.

BACKGROUND

With the development of display technologies, in order to make the human-computer interaction more flexible, the existing display panel includes both a display element and a touch electrode for realizing touch function. The touch electrode is located between a pixel electrode and a drain electrode, and an aperture is provided in the touch electrode for achieving a connection between the pixel electrode and the drain electrode.

However, some apertures in the touch electrode are very close to edges of the touch electrode. It results in that these apertures may be broken at the edges of the touch electrode and therefore has a negative effect on display and touch.

SUMMARY

In a first aspect, the present disclosure provides a display panel. The display panel includes a plurality of sub-pixels arranged in an array, a pixel electrode layer, a source-drain metal layer, an insulation layer, a flat layer, and a touch electrode layer. The plurality of sub-pixels is defined by a plurality of scan lines and a plurality of data lines in a manner that the plurality of scan lines and the plurality of data lines intersect and are insulated from one another, wherein the plurality of scan lines extends in a first direction and is arranged in a second direction. The pixel electrode layer comprises a pixel electrode corresponding to each of the plurality of sub-pixels. The source-drain metal layer comprises a drain electrode corresponding to each of the plurality of sub-pixels. The insulation layer comprising a first via hole corresponding to each of the plurality of sub-pixels. The flat layer comprises a second via hole corresponding to each of the plurality of sub-pixels. The touch electrode layer comprises a plurality of touch electrodes arranged in an array. An orthographic projection of each of the plurality of touch electrodes on a plane of the display panel overlaps more than one corresponding sub-pixels of the plurality of sub-pixels. Each of the plurality of touch electrodes comprises a third via hole corresponding to and overlapping one first via hole, and an edge of each of the plurality of touch electrodes in the first direction is located between adjacent sub-pixels among the plurality of sub-pixels. The more than one sub-pixels comprise at least one first sub-pixel, and each of the at least one first sub-pixel is adjacent to an edge of the touch electrode in the first direction. The source-drain metal layer, the flat layer, the touch electrode layer, the insulation layer, and the pixel electrode layer are stacked sequentially in a direction perpendicular to the plane of the display panel. As for the first via hole, the second via hole, and the third via hole corresponding to each first sub-pixel of the at least one first sub-pixel, a center point of the first via hole is deviated by more than 1 µm away from a first edge relative to a center point of the second via hole in the first direction, and a center point of the third via hole is deviated by more than 1 µm away from the first edge relative to the center point of the second via hole in the first direction, wherein the first edge is an edge of a touch electrode of the plurality of touch electrodes closest to said first sub-pixel in the first direction.

In a second aspect, the present disclosure provides a display device including the display panel of the first aspect.

BRIEF DESCRIPTION OF DRAWINGS

In order to more clearly illustrate technical solutions of embodiments of the present disclosure or the related art, the accompanying drawings used for describing the embodiments or the related art are briefly described below. The drawings described below are merely a part of the embodiments of the present disclosure. Based on these drawings, those skilled in the art can obtain other drawings without any creative efforts.

DESCRIPTION OF EMBODIMENTS

In order to make the objects, technical solutions, and advantages of embodiments of the present disclosure more clear, the technical solutions of the embodiments of the present disclosure are described below in details with reference to the drawings. It should be noted that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

Figure 1:
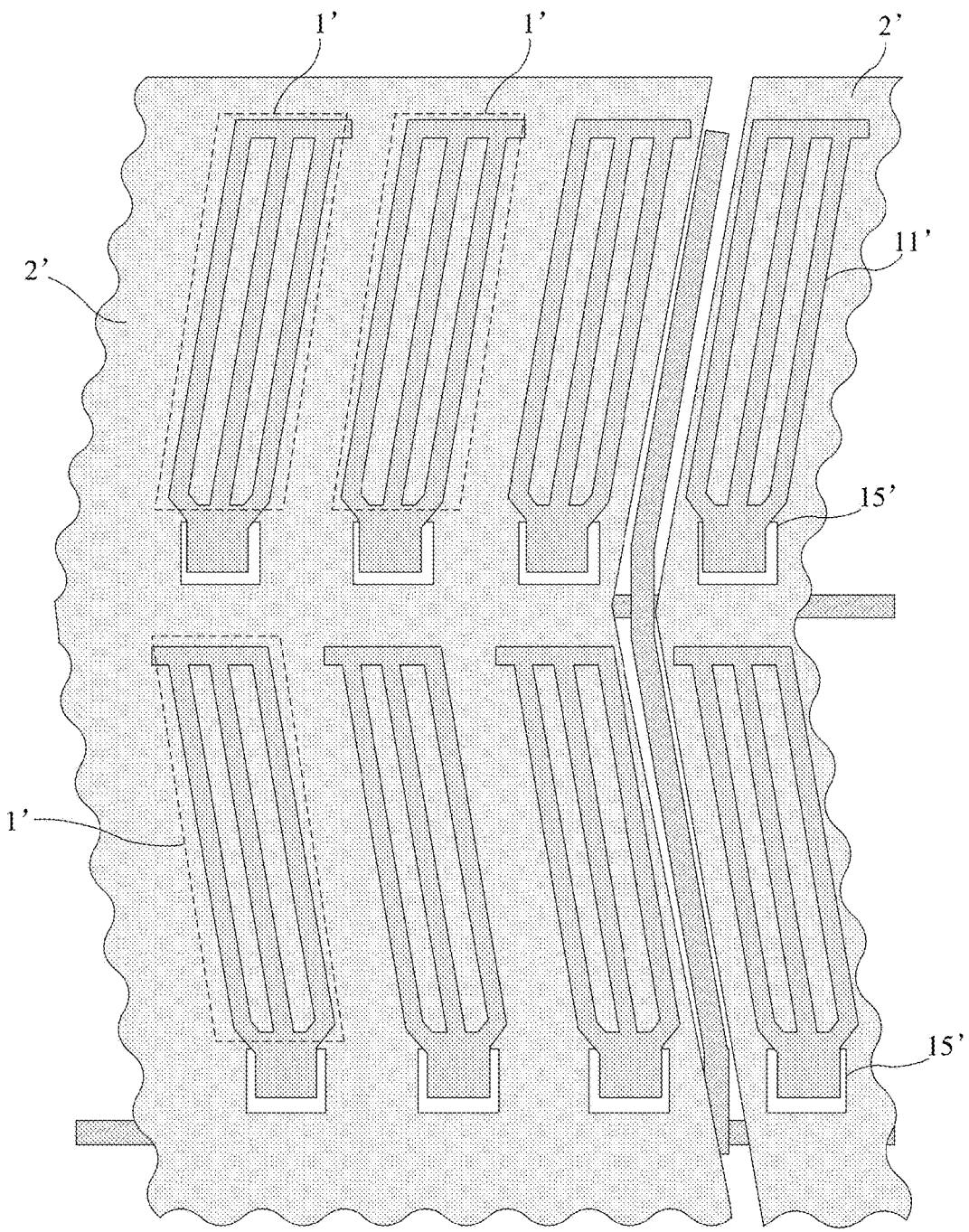
FIG. 1 illustrates a schematic diagram showing a partial structure of a display panel in the related art.
Figure 2:
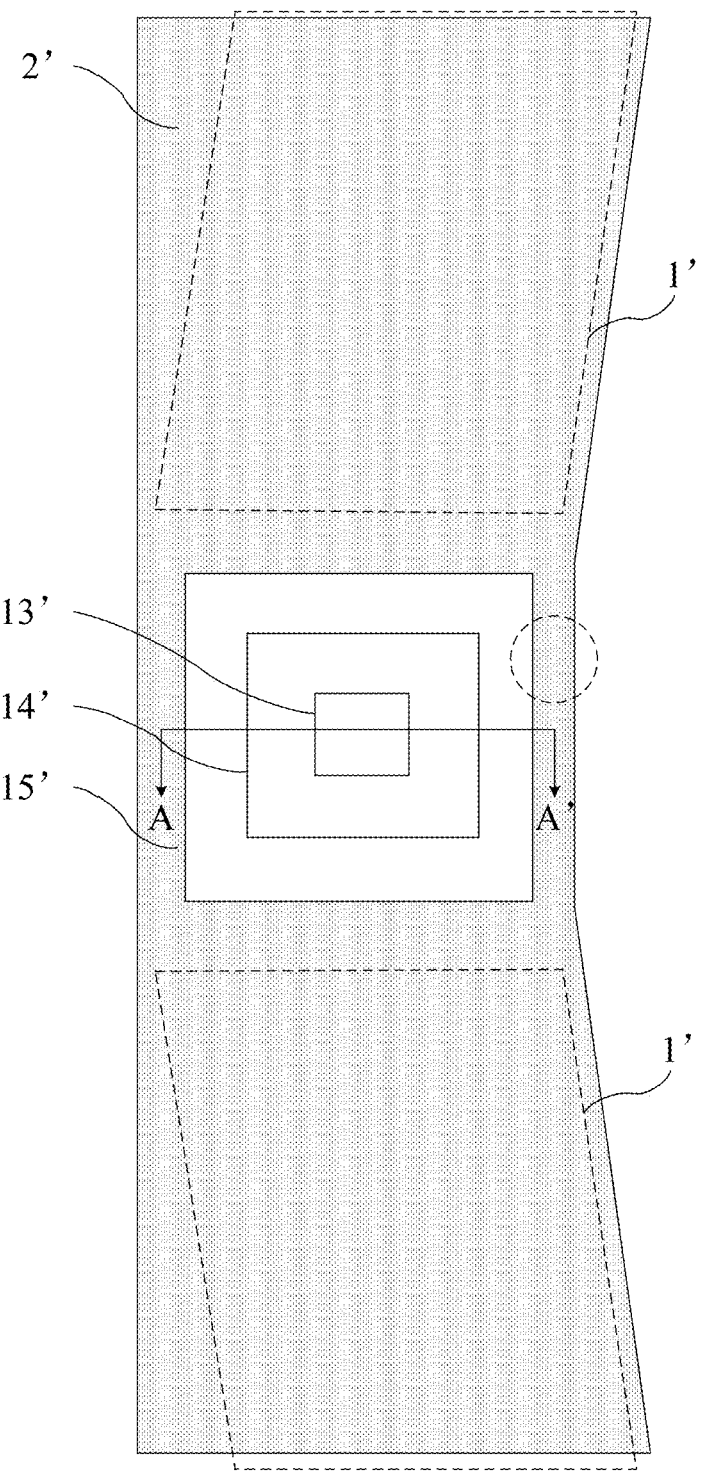
FIG. 2 illustrates a partially magnified schematic diagram showing a touch electrode at an edge in FIG. 1.
Figure 3:
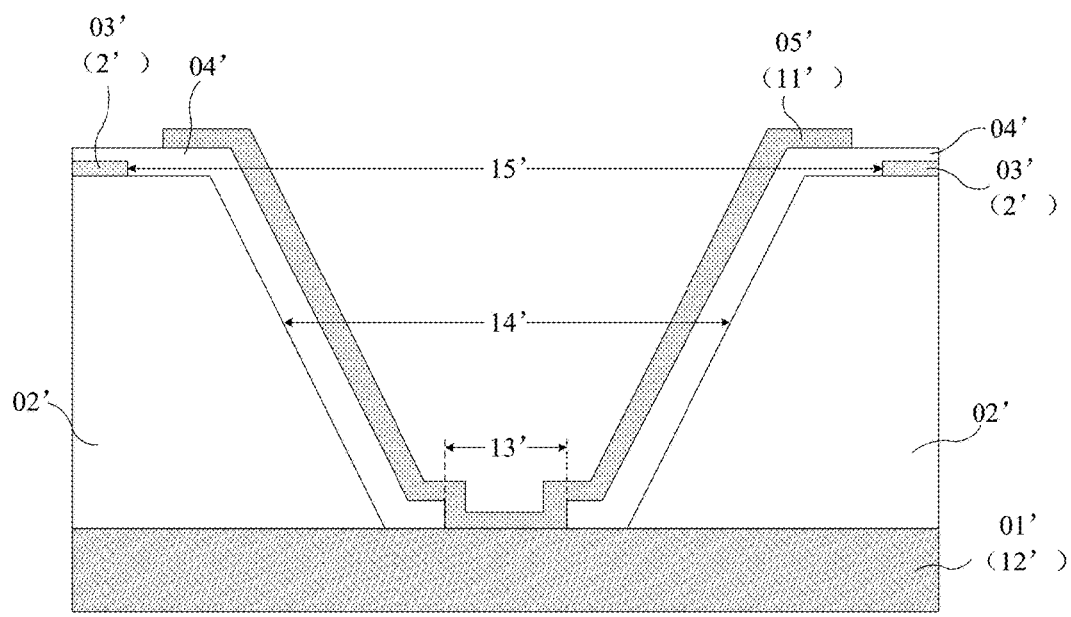
FIG. 3 illustrates a cross-sectional diagram along direction A-A' in FIG. 2.
Figure 4:
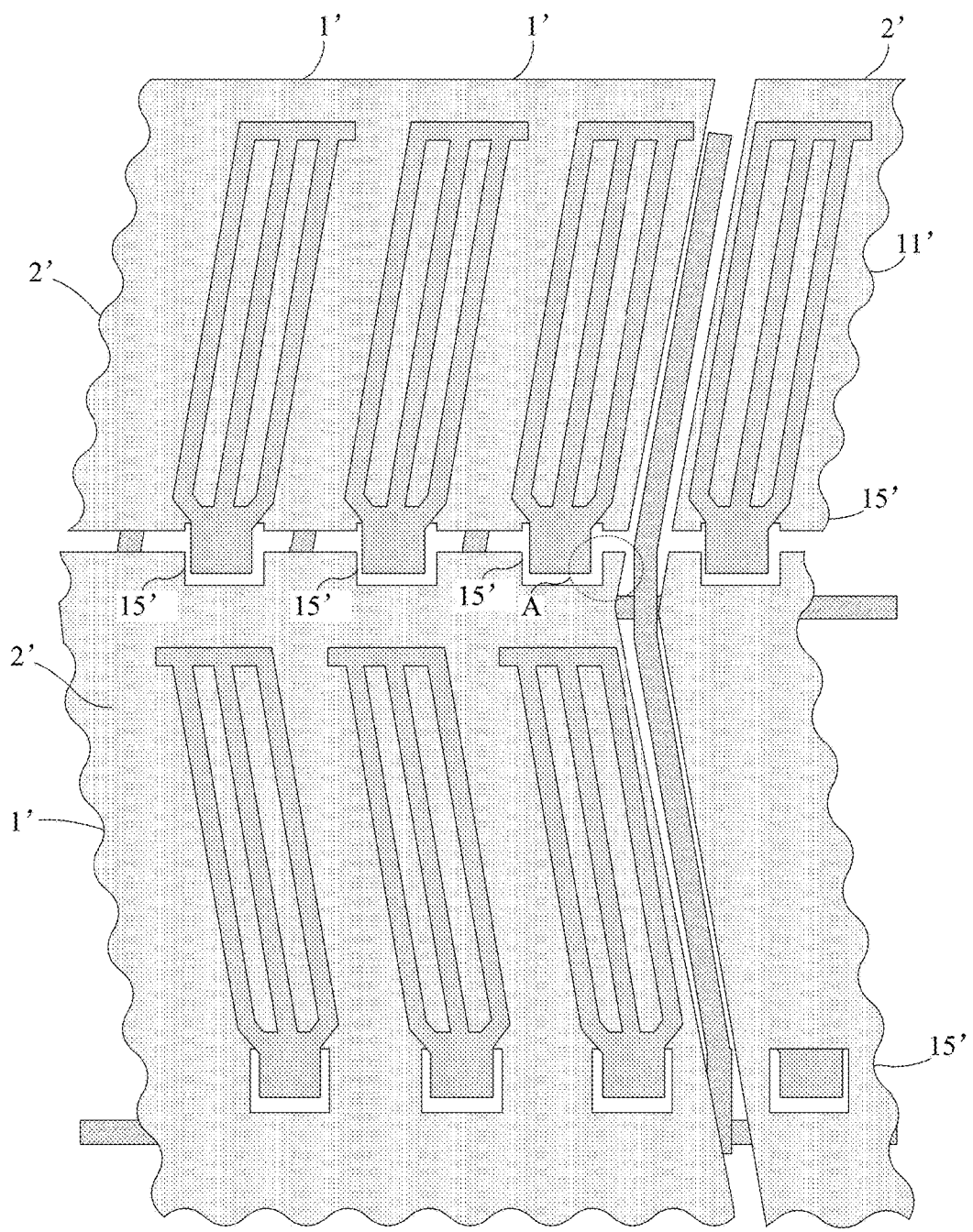
FIG. 4 illustrates a schematic diagram showing a partial structure of another display panel in the related art.
Figure 5:
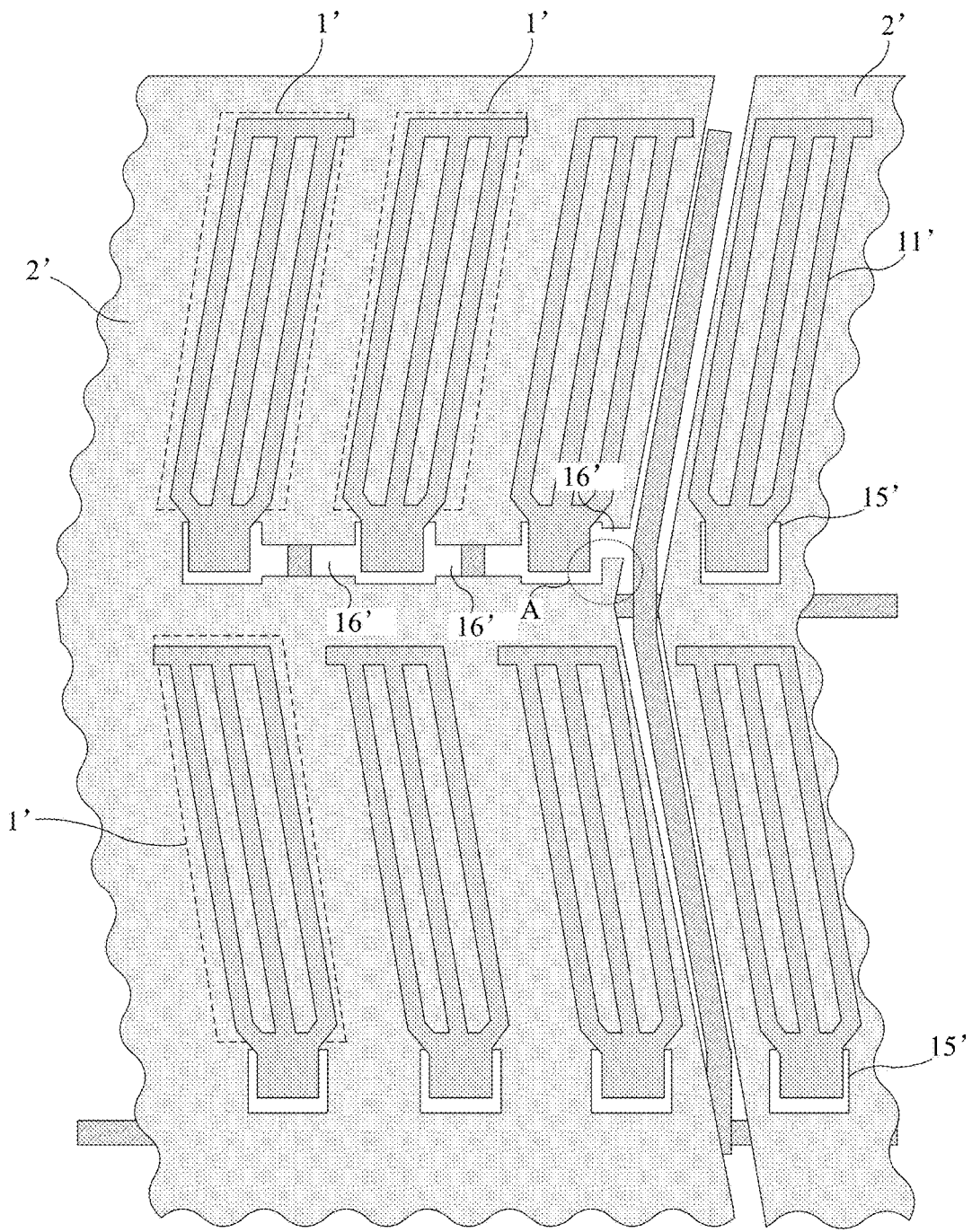
FIG. 5 illustrates a schematic diagram showing a partial structure of another display panel in the related art.
Figure 6:
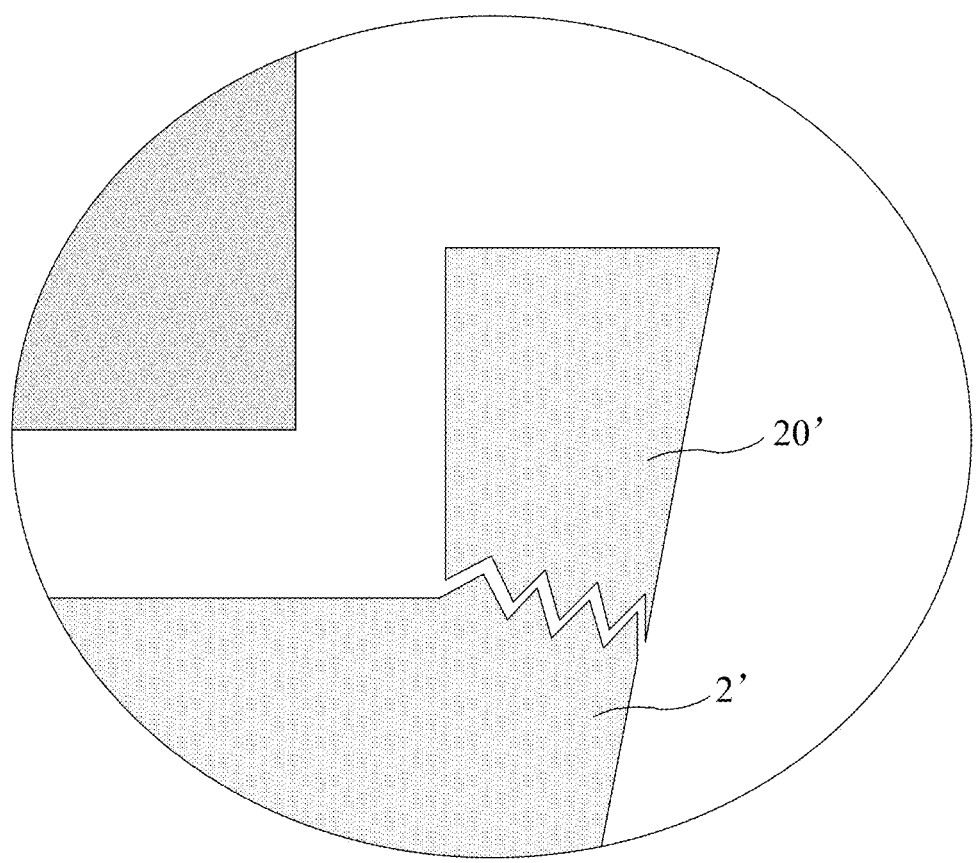
FIG. 6 illustrates a partially magnified schematic diagram at a portion A in FIG. 4 or FIG. 5.

In order to illustrate the characteristics of the embodiments of the disclosure, before a detailed description of the embodiments of the disclosure, the related art is explained first. FIG. 1 illustrates a schematic diagram showing a partial structure of a display panel in the related art; FIG. 2 illustrates a partially magnified schematic diagram showing a touch electrode at an edge in FIG. 1; and FIG. 3 illustrates a cross-sectional diagram along direction A-A' in FIG. 2. As shown in FIGS. 1-3, the display panel includes a plurality of sub-pixels 1' arranged in an array, a source-drain metal layer 01', a flat layer 02', a touch electrode layer 03', an insulation layer 04' and a pixel electrode layer 05'. The source-drain metal layer 01', the flat layer 02', a touch electrode layer 03', the insulation layer 04' and the pixel electrode layer 05' are sequentially stacked in a direction perpendicular to a plane of the display panel. The touch electrode layer 03' includes a plurality of touch electrodes 2' arranged in array (only two touch electrodes 2' are shown in FIG. 1), each of the plurality of touch electrodes 2' corresponding to more than one sub-pixels 1' among the plurality of sub-pixels 1'. The pixel electrode layer 05' includes a pixel electrode 11' corresponding to each sub-pixel 1' of the plurality of sub-pixels 1'. The source-drain metal layer 01' includes a drain electrode 12' corresponding to each sub-pixel 1' of the plurality of sub-pixels 1' (no drain electrode is shown in FIG. 1 and FIG. 2). The insulation layer 04' includes a first via hole 13' corresponding to each sub-pixel 1' of the plurality of sub-pixels 1'. The flat layer 02' includes a second via hole 14' corresponding to each sub-pixel 1' of the plurality of sub-pixels 1'. Each touch electrode 2' of the plurality of touch electrodes 2' includes a third via hole 15' corresponding to each first via hole 13'. The pixel electrode 11' is connected to the drain electrode 2' via the first via hole 13', the second via hole 14' and the third via hole 15'. However, at an edge of the touch electrode 2' (for example, the position annotated by a circular dotted line in FIG. 2), the touch electrode 2' is easily disconnected there due to a short distance between the third via hole 15' and the edge of the touch electrode. In addition, touch electrode 2' is further multiplexed as a common electrode, and liquid crystals deflect by an electric field between the touch electrode 2' and the pixel electrode 11' in a display stage so as to realize display function. A disconnection at the edge of touch electrode 2' may adversely impact current transmission on the touch electrode 2', which in turn deteriorates display effect or touch effect. Particularly, for some special positions, the adverse effects of disconnection at the edge of the touch electrode 2' are even worse. For example, as shown in FIGS. 4-6, FIG. 4 illustrates a schematic diagram showing a partial structure of another display panel in the related art; FIG. 5 illustrates a schematic diagram showing a partial structure of another display panel in the related art; and FIG. 6 illustrates a partially magnified schematic diagram at a portion A in FIG. 4 or FIG. 5. As shown in FIGS. 4 and 6, when the third via hole 15' is located between two touch electrodes 2' adjacent to each other up-to-down, since the upper and lower touch electrodes 2' are separated from each other as two separate parts, as shown in FIG. 6, the touch electrode 2' will be split to form a separate suspension part 20' if the third via hole 15' is disconnected from the edge of the touch electrode. Further, since the suspension part 20' is insulated from the touch electrode 2', the current on the touch electrode 2' will not be transported to the suspension part 20', and in the display stage, the suspension section 20' cannot provide a common electrode voltage normally. Therefore, the adverse effect on the display effect is significant. Similarly, as shown in FIGS. 5 and 6, in order to adjust a signal on the touch electrode 2', an aperture 16' is provided in the same touch electrode 2' between the sub-pixels 1' adjacent to each other up-to-down, and the aperture 16' extends along a horizontal direction. When the aperture 16' is arranged between the third via hole 15' and the edge of touch electrode, the touch electrode 2' will also be split to form a separate suspension part 20' if the third via hole 15' is broken from the edge of the touch electrode. Further, since the suspension part 20' is insulated from the touch electrode 2', the current on the touch electrode 2' will not be transported to the suspension part 20', and in the display stage, the suspension section 20' cannot provide a common electrode voltage normally, thus causing significant adverse effect on the display effect.

Figure 7:
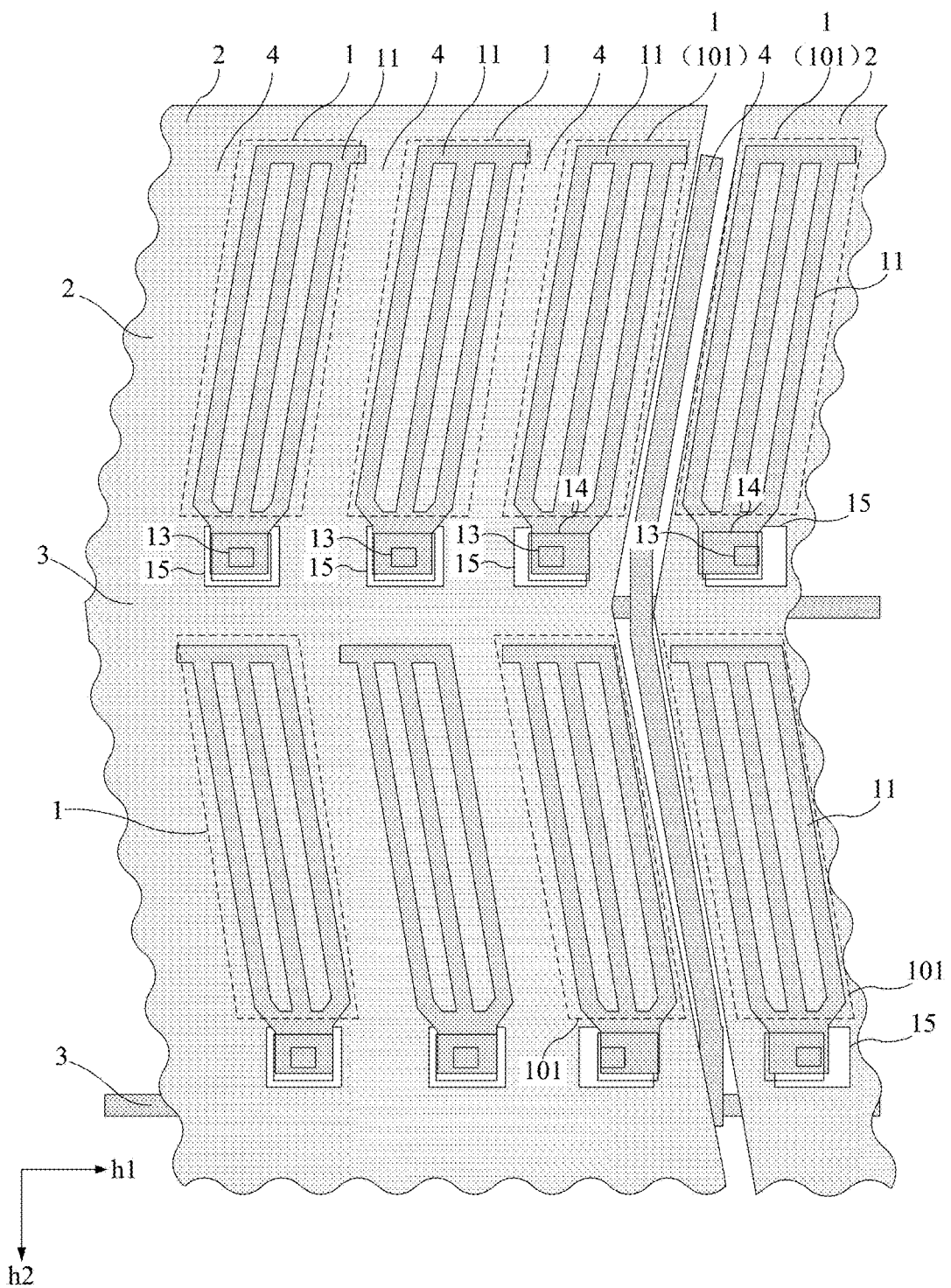
FIG. 7 illustrates a schematic diagram showing a partially structure of a display panel according to an embodiment of the present disclosure.
Figure 8:
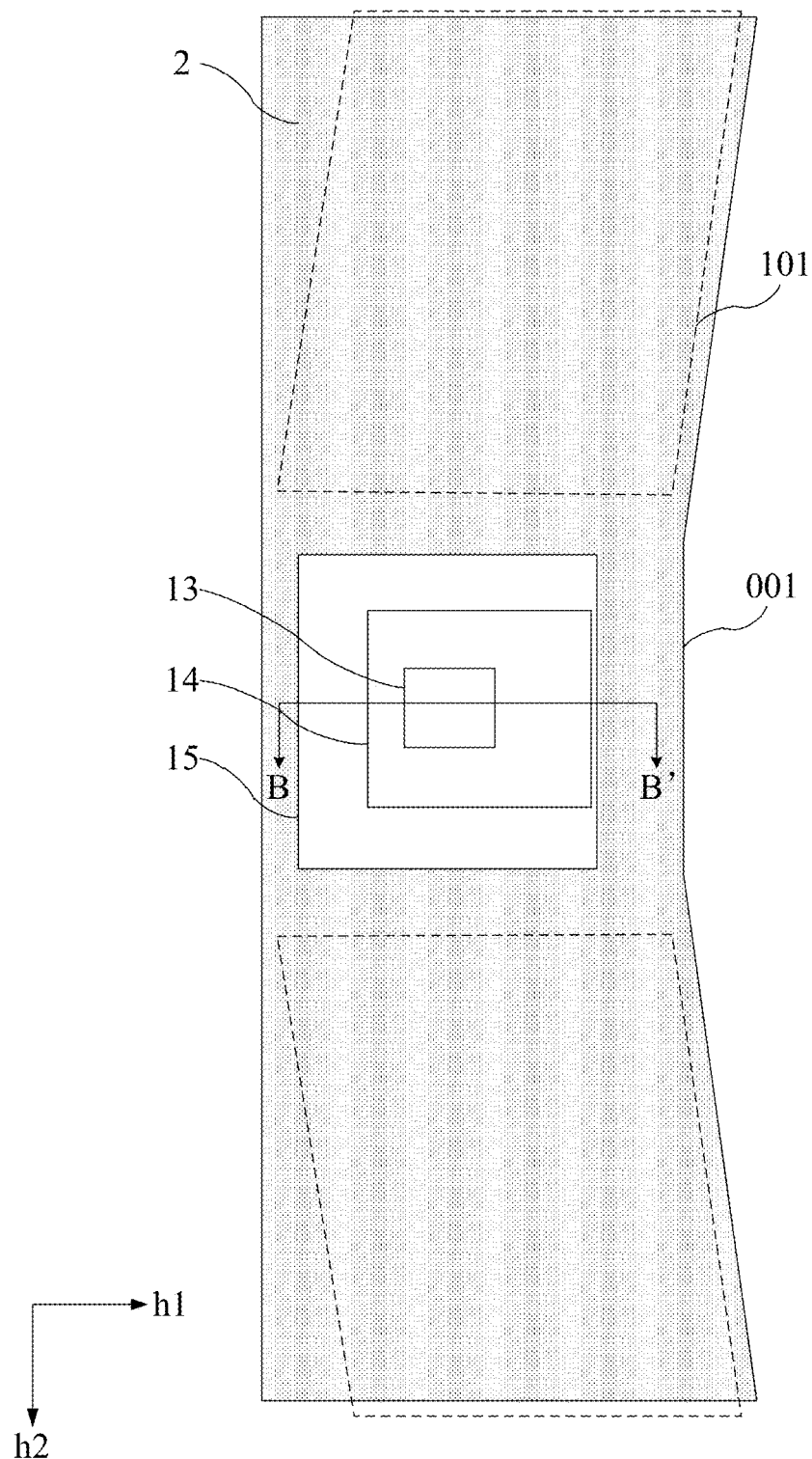
FIG. 8 illustrates a partially magnified schematic diagram containing a first sub-pixel in FIG. 7.
Figure 9:
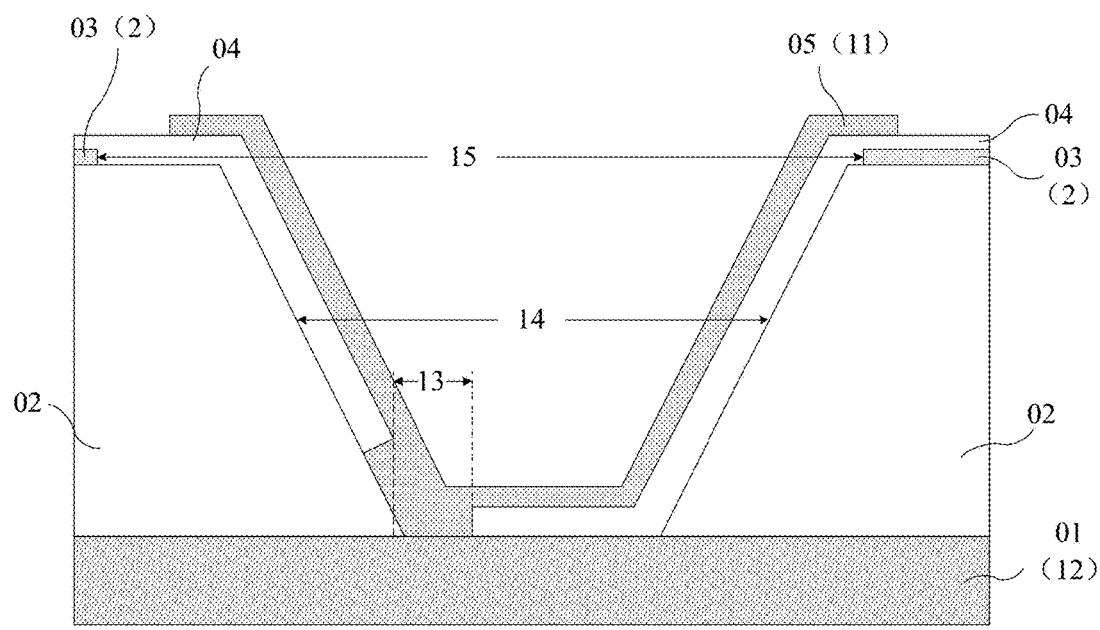
FIG. 9 illustrates a cross-sectional diagram along direction B-B' in FIG. 8.

FIG. 7 illustrates a schematic diagram showing a partially structure of a display panel according to an embodiment of the present disclosure; FIG. 8 illustrates a partially magnified schematic diagram containing a first sub-pixel in FIG. 7; and FIG. 9 illustrates a cross-sectional diagram along direction B-B' in FIG. 8. As shown in FIGS. 7-9, the present disclosure provides a display panel including a source-drain metal layer 01, a flat layer 02, a touch electrode layer 03, an insulation layer 04 and a pixel electrode layer 05. The source-drain metal layer 01, the flat layer 02, the touch electrode layer 03, the insulation layer 04, and the pixel electrode layer 05 are arranged sequentially in a direction perpendicular to a plane of the display panel. The display panel includes a plurality of sub-pixels 1 arranged in an array defined by a plurality of scanning lines 3 and a plurality of data lines 4 in a manner that the plurality of scanning lines 3 and the plurality of data lines 4 intersect and are insulated from one another. The pixel electrode layer 05 includes a pixel electrode 11 corresponding to each of the plurality of sub-pixels 1. The source-drain metal layer 01 includes a drain electrode 12 corresponding to each of the plurality of sub-pixels 1. The insulation layer 04 includes a first via hole 13 corresponding to each of the plurality of sub-pixels 1. The flat layer 02 includes a second via hole 14 corresponding to each of the plurality of sub-pixels 1. The plurality of scan lines 3 extends along a first direction h1 and is arranged in a second direction h2. The touch electrode layer 03 includes a plurality of touch electrodes 2 arranged in an array, and an orthographic projection of each of the plurality of touch electrodes 2 on the plane of the touch display panel overlaps more than one corresponding sub-pixels 1 of the plurality of sub-pixels 1. Each of the plurality of touch electrodes 2 includes a third via hole 15 corresponding to one first via hole 13, and the third via hole 15 overlaps the corresponding first via hole 13. An edge of each of the plurality of touch electrodes 2 in the first direction h1 is located between adjacent ones of the plurality of sub-pixels 1. At least one sub-pixel 1 of the plurality of sub-pixels 1 is a first sub-pixel 101 which is adjacent to an edge of the touch electrode in the first direction h1. As for the first via hole 13, the second via hole 14, and the third via hole 15 corresponding to each first sub-pixel 101, in the first direction h1, a center point of the first via hole 13 is deviated by 1 μm or more away from a first edge 001 with respect to a center point of the second via hole 14 in the first direction h1, and a center point of the third via hole 15 is deviated by 1 μm or more away from a first edge 001 with respect to a center point of the second via hole 14 in the first direction h1, wherein the first edge 001 is an edge of the touch electrode closest to the first sub-pixel 101 in the first direction h1.

Figure 10:
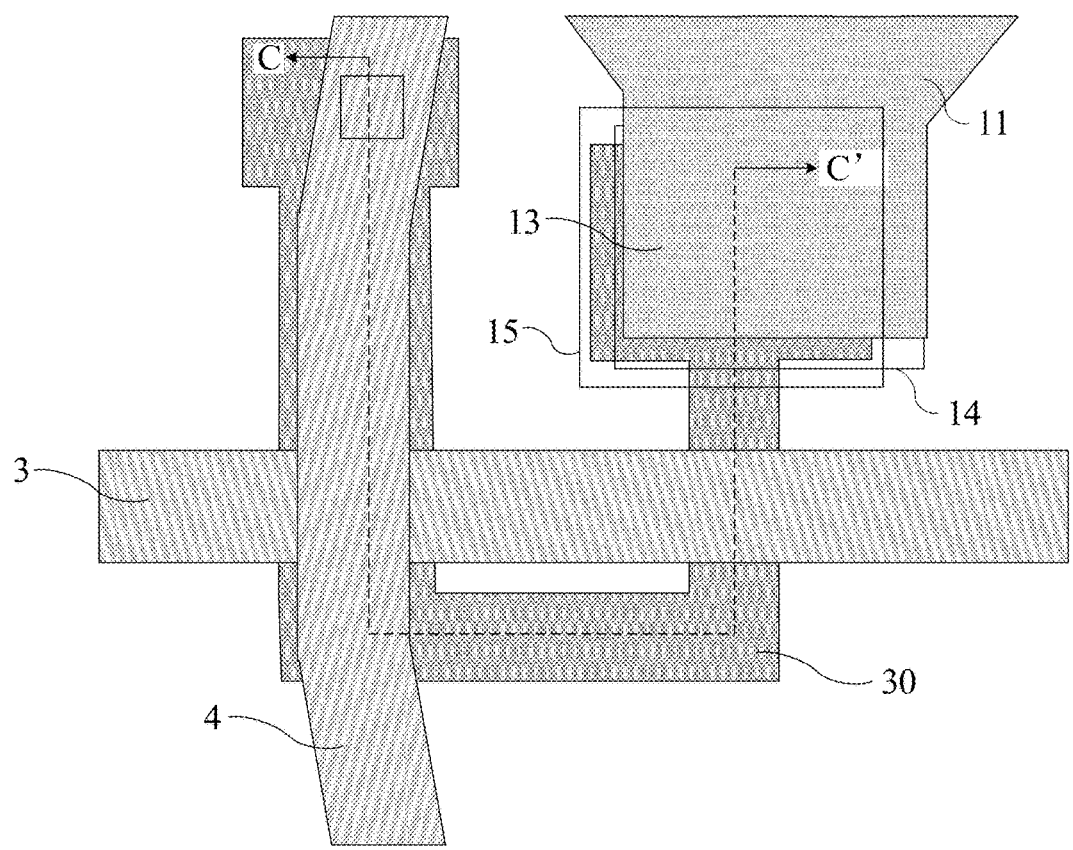
FIG. 10 illustrates a partially magnified schematic diagram showing a local region in FIG. 7.
Figure 11:
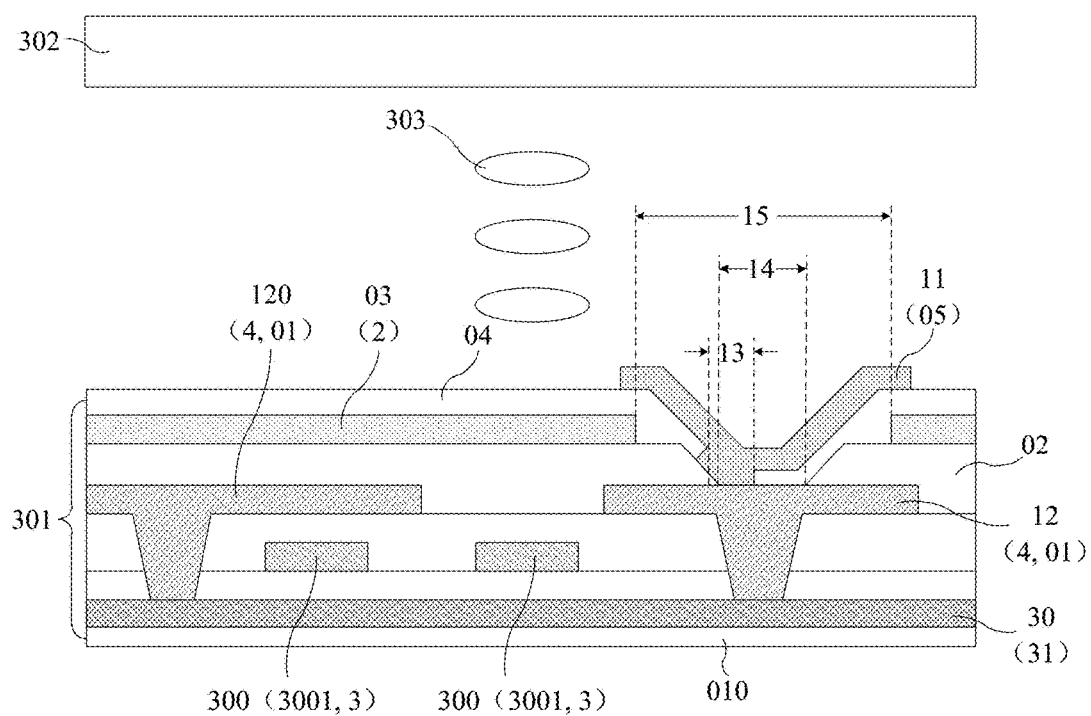
FIG. 11 illustrates a cross-sectional diagram along direction C-C' in FIG. 10.

The display panel in the embodiments of the present disclosure is a liquid crystal display panel, as shown in FIGS. 10-11. FIG. 10 illustrates a partially magnified schematic diagram showing a local region in FIG. 7; and FIG. 11 illustrates a cross-sectional diagram along direction C-C' in FIG. 10. The liquid crystal display panel includes an array substrate 301, a color film substrate 302, and a liquid crystal 303 located between the array substrate 301 and the color film substrate 302. The array substrate 301 includes a substrate 010, an active layer 30, a gate electrode layer 300, a source-drain metal layer 01, a flat layer 02, a touch electrode layer 03, an insulation layer 04, and a pixel electrode layer 05. The substrate 010, the active layer 30, the gate electrode layer 300, the source-drain metal layer 01, the flat layer 02, the touch electrode layer 03, the insulation layer 04, and the pixel electrode layer 05 are stacked in a direction perpendicular to a plane of the display panel. The gate electrode 3001 is a portion of the scan line 3 overlapping the active layer 30. Each of the plurality of sub-pixels 1 corresponds to one thin-film transistor. Each thin-film transistor includes a source electrode 120, a drain electrode 12, a gate electrode 3001, and an active portion 31. The source electrode 120 of the thin-film transistor is connected to a corresponding data line 4 and the drain electrode 12 of the thin-film transistor is the drain electrode 12 shown in FIG. 9. The drain electrode 12 is connected to a corresponding pixel electrode 11, the gate electrode 3001 of the thin-film transistor is connected to a corresponding scan line 3, the source electrode 120 is connected to the active portion 31 by a via hole, and the drain electrode 12 is connected to the active portion 31 by a via hole. The thin film transistor shown in FIGS. 10 and 11 is a dual-gate structure (i.e., the thin film transistor includes two gate electrodes). In other implementable ways, the thin-film transistor can be a single-gate or other structure. The plurality of scan lines 3 is used for outputting scan signals row-by-row, under control of which, the thin-film transistors are turned on. When the thin-film transistor is turned on, a signal on each of the plurality of data lines 4 is transmitted through the corresponding thin-film transistor to the corresponding pixel electrode 11. Each of the plurality of touch electrodes 2 is connected to one respective touch signal line. In a display stage, each touch electrode 2 is further multiplexed as a common electrode, a common electrode voltage is applied to each touch electrode 2, and an electric field is formed between the pixel electrode 11 and the touch electrode 2 so as to control liquid crystals 303 at the corresponding sub-pixel 1 to deflect to a respective angle, thereby achieving the display function. In a touch stage, a touch signal is applied to each of the plurality of touch electrodes 2, while a drive chip IC receives a respective induction signal generated by each of the plurality of touch electrode 2, thereby achieving the touch function by the induction signal. Comparing FIG. 2 with FIG. 8, it can be seen that, the distance between the third via hole and the edge of the touch electrode is increased in the embodiment of the present disclosure, so that it is not easy to disconnect the third via hole at this position.

In the embodiment of the present disclosure, in the display panel, since the first via hole and the third via hole adjacent to the edge of the touch electrode are deviated away from the edge of the touch electrode relative to the second via hole, the probability that the touch electrode is broken between the third via hole and the edge of the touch electrode is reduced, further improving the display or touch effect.

Figure 12:
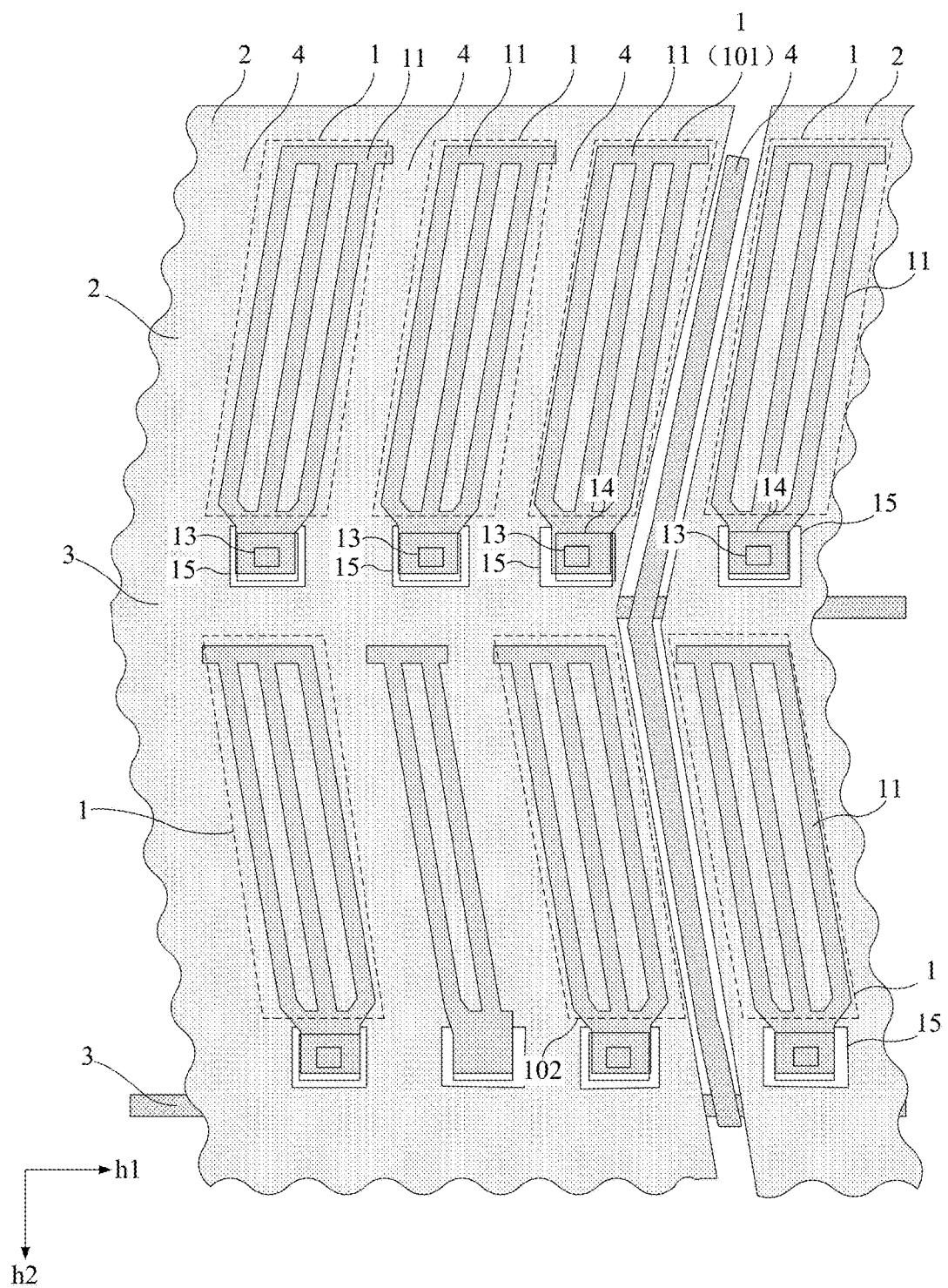
FIG. 12 illustrates a schematic diagram showing a partial structure another display panel according to an embodiment of the present disclosure.
Figure 13:
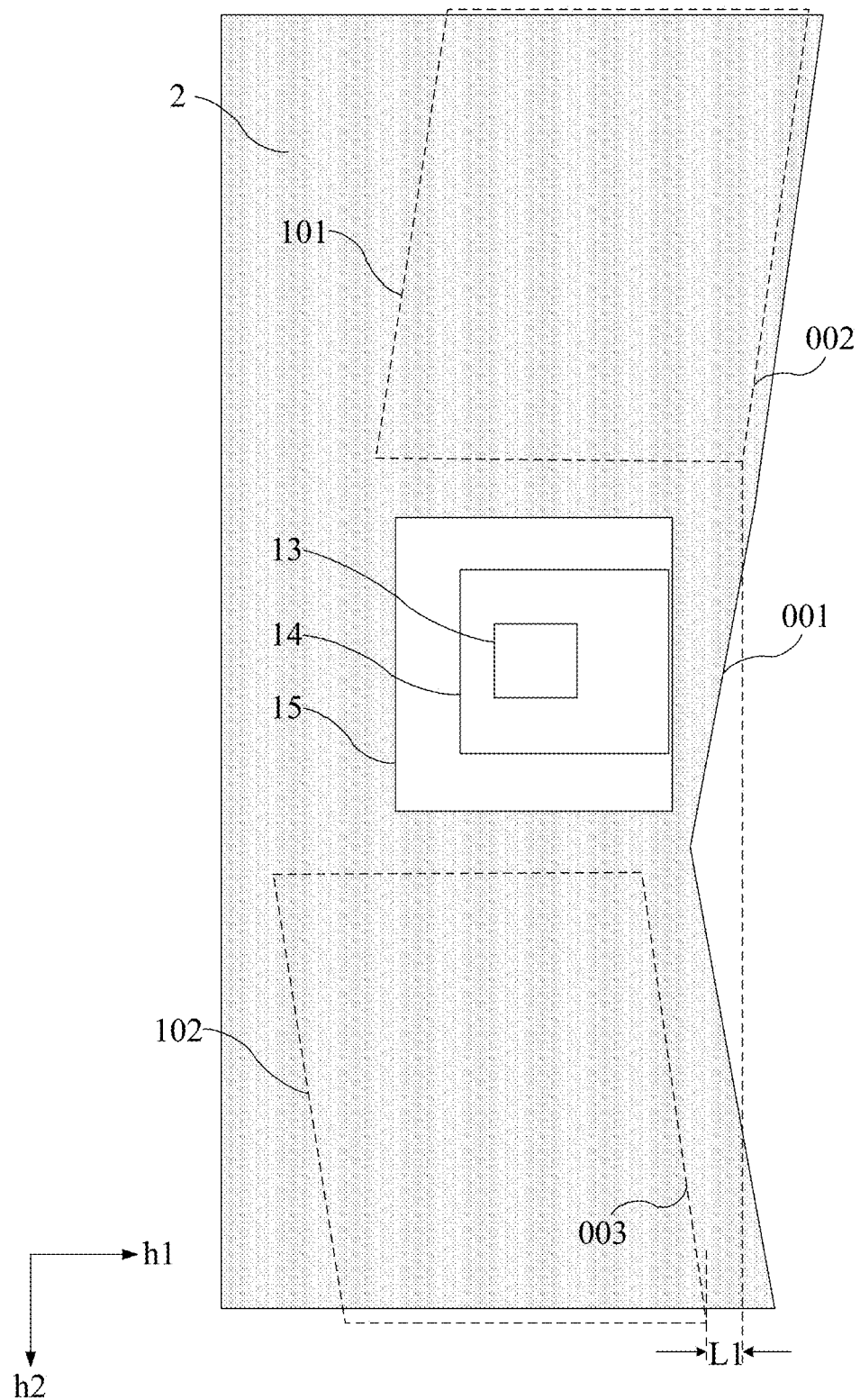
FIG. 13 illustrates a partially magnified schematic diagram containing a first sub-pixel in FIG. 12.

FIG. 12 illustrates a schematic diagram showing a partial structure another display panel according to an embodiment of the present disclosure, and FIG. 13 illustrates a partially magnified schematic diagram containing a first sub-pixel in FIG. 12. Alternatively, as shown in FIGS. 12 and 13, the display panel includes a second sub-pixel 102 corresponding to each first sub-pixel 101, and the first sub-pixel 101 is adjacent to the corresponding second sub-pixel 102 in the second direction h2. The first sub-pixel 101 has a second edge 002, and the second edge 002 is an edge of the first sub-pixel 101 in the first direction h1 close to the first edge 001. It should be noted that, the edge of the sub-pixel in the present embodiment can also be understood as the edge of the pixel electrode corresponding to the sub-pixel. The second sub-pixel 102 has a third edge 003, and the third edge 003 is an edge of the second sub-pixel 102 in the first direction h1 close to the first edge 001. The third edge 003 is deviated by more than fpm away from the first edge relative to the second edge 002. That is, the third edge 003 is deviated by a distance L1 away from the first edge relative to the second edge 002, and L1 is greater than 1 μm. The first via hole 13, the second via hole 14, and the third via hole 15 corresponding to a same first sub-pixel 101 are all located on one side of the first sub-pixel 101 close to the second sub-pixel 102.

Figure 14:
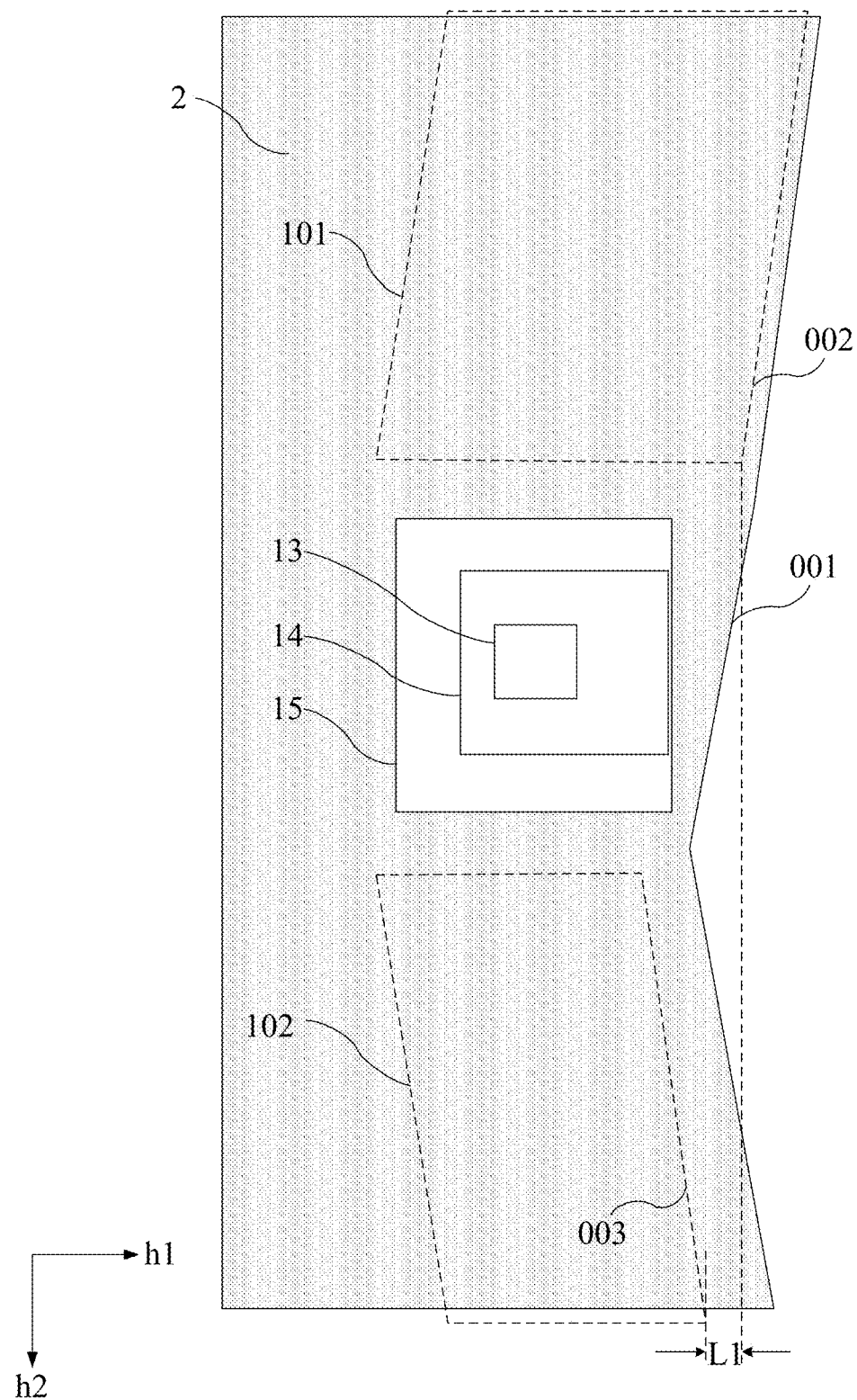
FIG. 14 illustrates a partially magnified schematic diagram showing a structure of a local portion containing a first sub-pixel of another display panel according to an embodiment of the present disclosure.

The display panel shown in FIGS. 12 and 13 differs from the display panel shown in FIGS. 7-9 in that only the particular sub-pixel adjacent to the edge of the touch electrode at the corner of the edge in the first direction h1 is regarded as the first sub-pixel 101, rather than each of the sub-pixels adjacent to the edge of the touch electrode in the first direction h1 is regarded as the first sub-pixel 101. As for the first sub-pixel 101 shown in FIGS. 12 and 13, a right edge of the second sub-pixel 102 (i.e., the third edge 003, hereinafter the same) under and adjacent to the first sub-pixel 101 is deviated towards the left relative to a right edge of the first sub-pixel 101 (i.e., the second edge 002, hereinafter the same). Therefore, the right edge of the touch electrode which extends from top to bottom is also deviated toward the left at a position between the first sub-pixel 101 and the second sub-pixel 102. If the third via hole 15 was not deviated toward the left, the third via hole 15 would be closer to the right edge of the touch electrode, and it is easier to disconnect the touch electrode 2 at this position. Therefore, comparing FIG. 6 with FIG. 13, it can be seen that the display effect can be further improved by applying the present embodiment. It should be noted that the second sub-pixel 102, as shown in FIG. 12 and FIG. 13, is deviated integrally toward the left, which leads to the result that the right edge of the second sub-pixel 102 is deviated toward the left relative to the right edge of the first sub-pixel 101. However, the embodiments of the present disclosure are not limited in this. For example, in other implementable ways, as shown in FIG. 14, FIG. 14 illustrates a partially magnified schematic diagram showing a structure of a local portion containing a first sub-pixel of another display panel according to an embodiment of the present disclosure. In the structure shown in FIG. 14, the second sub-pixel 102 has a width in the first direction h1 smaller than a width of the first sub-pixel 101 in the first direction h1, and there is no relative deviation between the left edge of the first sub-pixel 101 and the left edge of the second sub-pixel 102 in the first direction h1. Only the right edge of the first sub-pixel 101 and the right edge of the second sub-pixel 102 are relatively deviated in the first direction h1. As shown in FIG. 14, the pixel electrode of the first sub-pixel 101 has a width in the first direction h1 greater than a width of the pixel electrode of the second sub-pixel 102 in the first direction h1.

Figure 15:
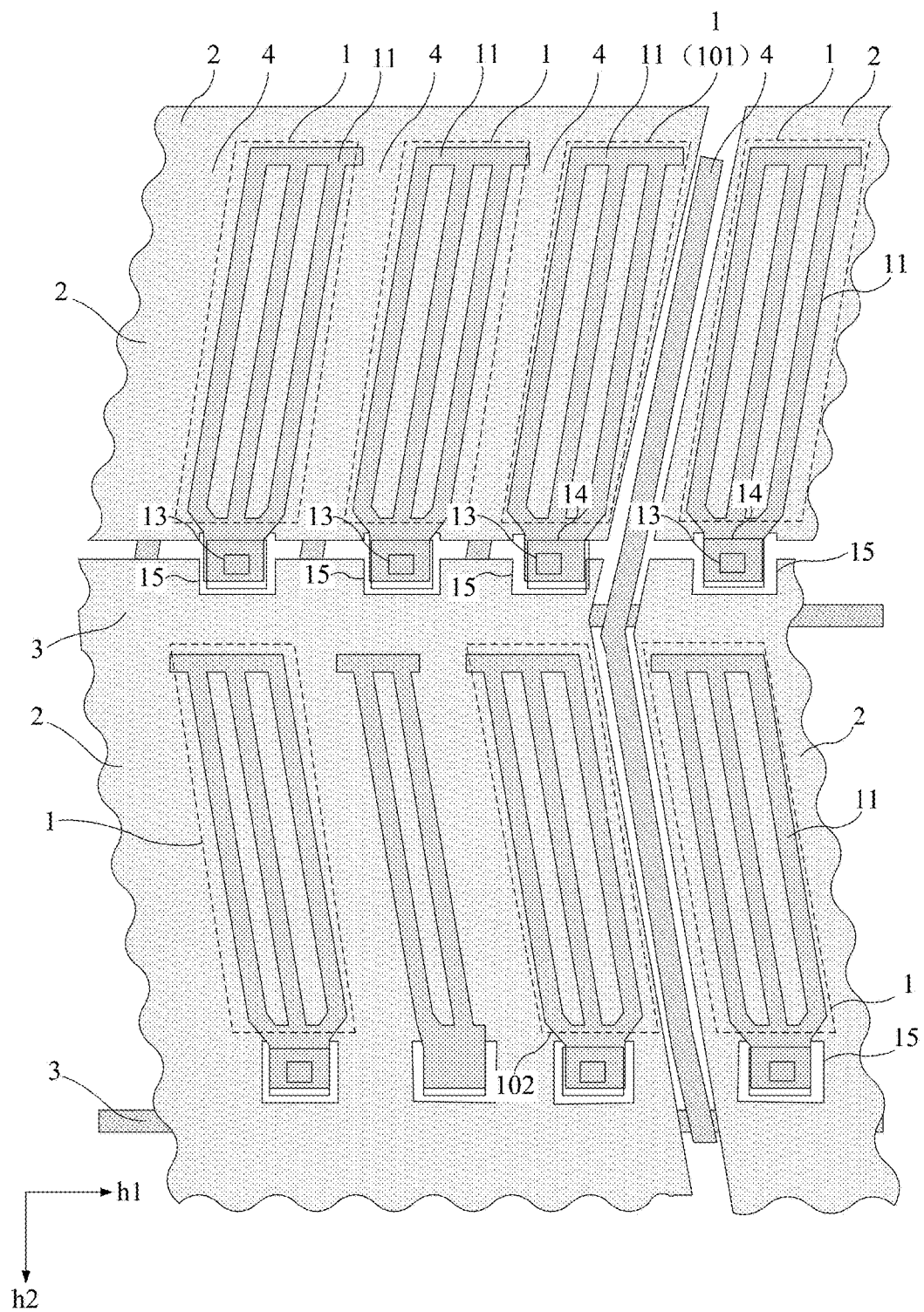
FIG. 15 illustrates a partially structural schematic diagram another display panel according to an embodiment of the present disclosure.
Figure 16:
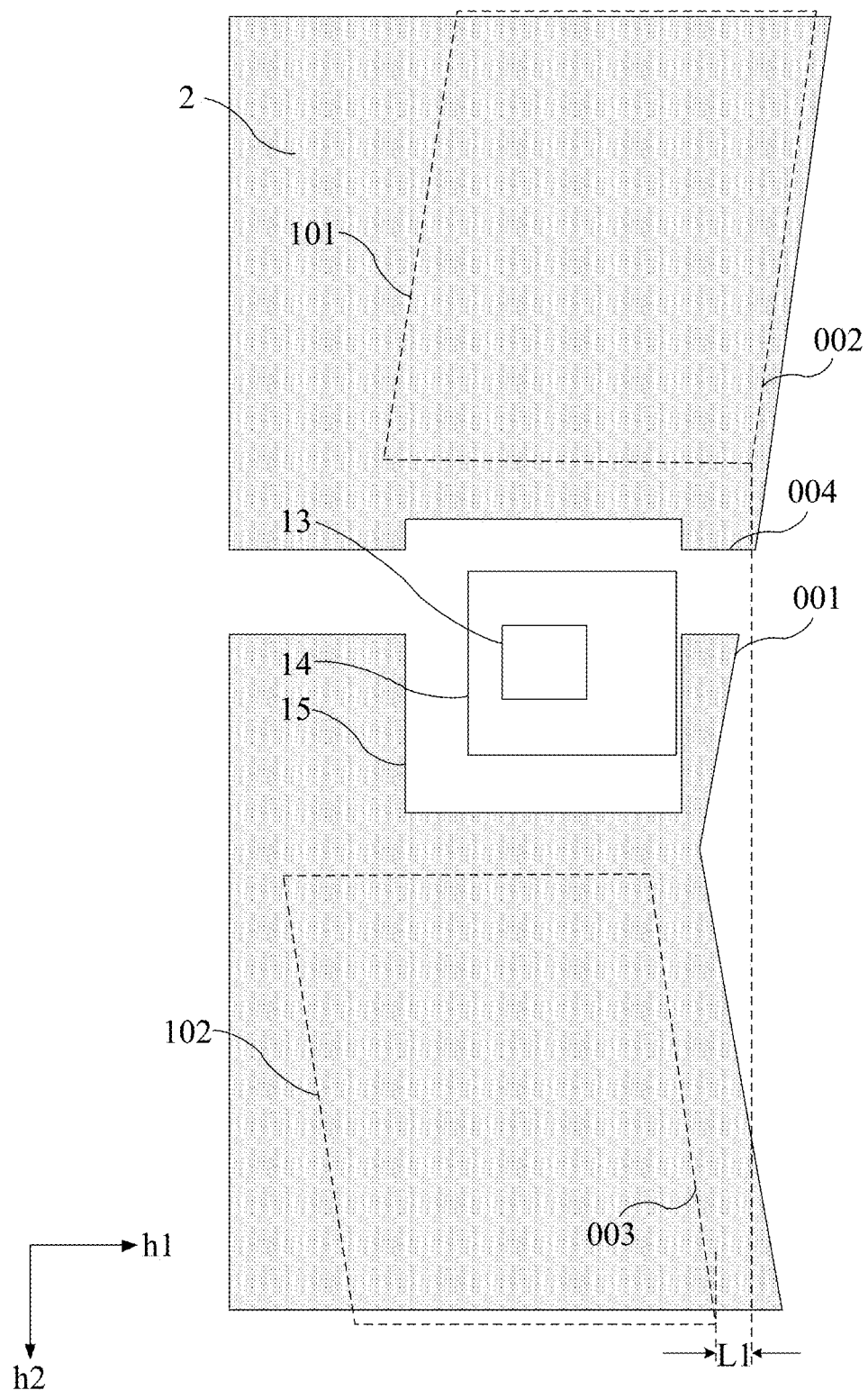
FIG. 16 illustrates a partially magnified schematic diagram showing a local portion containing a first sub-pixel in FIG. 15.

FIG. 15 illustrates a partially structural schematic diagram another display panel according to an embodiment of the present disclosure, and FIG. 16 illustrates a partially magnified schematic diagram showing a local portion containing a first sub-pixel in FIG. 15. Alternatively, as shown in FIGS. 15 and 16, the first sub-pixel 101 is adjacent to the edge of the corresponding touch electrode 2 in the second direction h2; and the first via hole 13, the second via hole 14, and the third via hole 15 corresponding to the same first sub-pixel 101 are located on one side close to a fourth edge 004, wherein the fourth edge 004 is an edge of a touch electrode closest to the first sub pixel 101 in the second direction h2.

In the display panel structure shown in FIGS. 15 and 16, a corner sub-pixel adjacent to the edge of the touch electrode both in the first direction and in the second direction is regarded as the first sub-pixel 101. As shown in FIG. 16, two touch electrodes 2 adjacent to each other up-to-down are separated from each other at the third via hole 15 corresponding to the first sub pixel 101. If the third via hole 15 was not deviated toward the left, the third via hole 15 would be closer to the right edge of the touch electrode, and thus the touch electrode 2 will be easily disconnected at this position. Further, since the two touch electrodes 2 themselves are separated from each other at this position, if the third via hole 15 is further disconnected due to being closer to the right edge of the touch electrode, an suspended portion independent from the touch electrode will be formed. Since the suspended portion is insulated from the touch electrode, the current on the touch electrode will not be transported to the suspended portion. In the display stage, the suspended portion cannot provide the common electrode voltage normally, resulting in that much worse display effect. Therefore, the application of the present embodiment can further improve the display effect.

Figure 17:
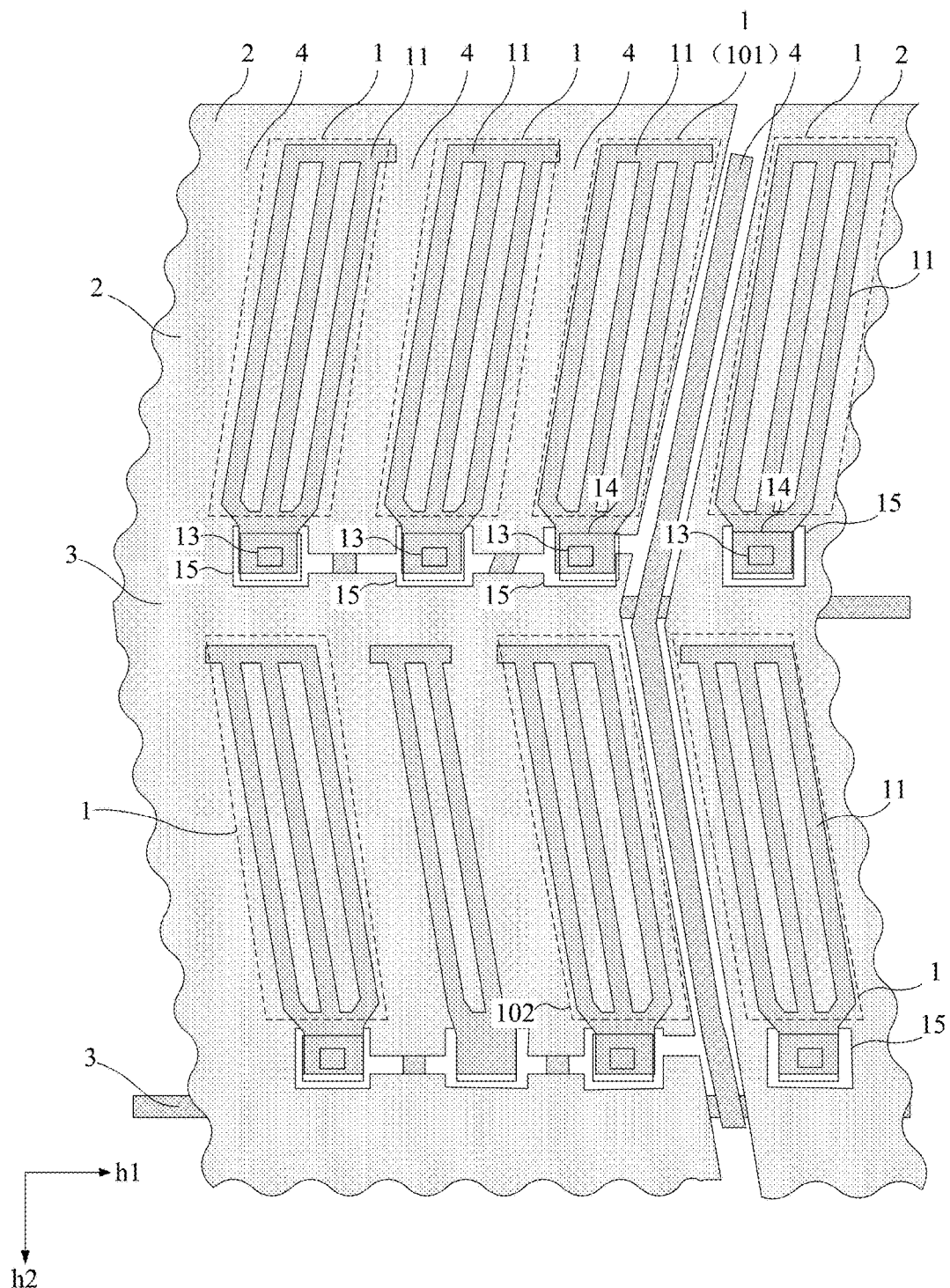
FIG. 17 illustrates a partially magnified schematic diagram of another display panel according to an embodiment of the present disclosure.
Figure 18:
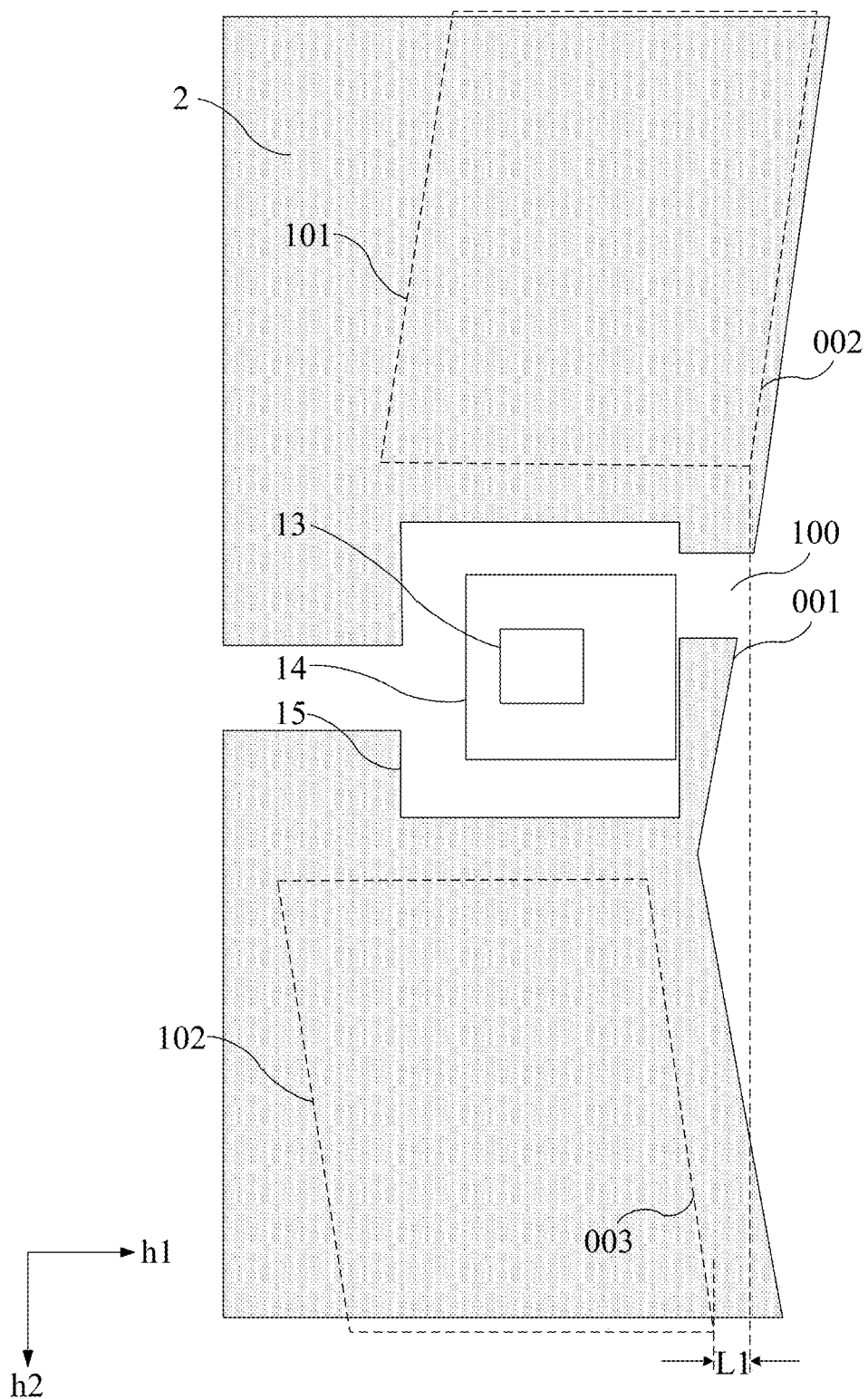
FIG. 18 is a partially magnified schematic diagram of the structure shown in FIG. 17 containing a first sub-pixel.

FIG. 17 illustrates a partially magnified schematic diagram of another display panel according to an embodiment of the present disclosure, and FIG. 18 is a partially magnified schematic diagram of the structure shown in FIG. 17 containing a first sub-pixel. Alternatively, as shown in FIGS. 17 and 18, the touch electrode 2 has an aperture 100 between each first sub-pixel 101 and a second sub-pixel 102 corresponding to the each first sub-pixel 101, and the aperture 100 extends from the third via hole 15 to the first edge 001.

In the same touch electrode 2, for the purpose of adjusting the current or others, an aperture 100 extending along the first direction h1 may be arranged between two sub-pixels 1 adjacent to each other up-to-down. However, the aperture 100 cannot cut apart the whole touch electrode 2. In this structure, if the aperture 100 is arranged between the first sub-pixel 101 and the second sub-pixel 102, the first sub-pixel 101 will be a corner sub-pixel, and if the third via 15 hole was not deviated toward the left, the third via hole 15 would be closer to the right edge of the touch electrode, causing that the touch electrode 2 is easily broken at this position. Further, since the two touch electrodes 2 themselves are separated from each other at this position, if the touch electrode 2 is broken at this position due to a short distance between the third via hole 15 and the right edge of the touch electrode, a suspended portion independent from the touch electrode will be formed. Since the suspended portion is insulated from the touch electrode, the current on the touch electrode cannot be transported to the suspended portion. In the display stage, the suspended portion cannot provide the common electrode voltage normally, thus causing significantly worse display effect. Therefore, the application of the present embodiment can further improve the display effect.

Figure 19:
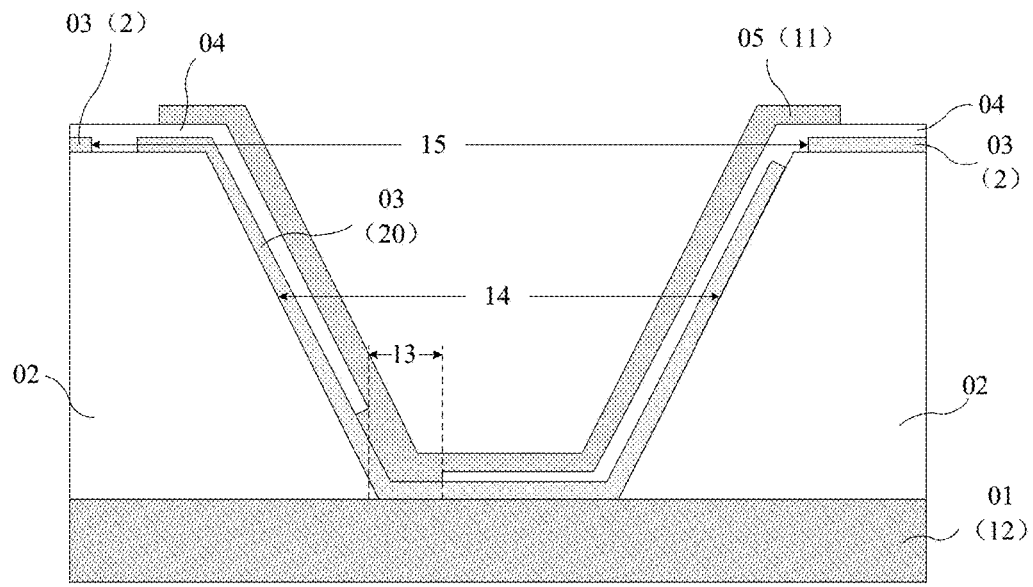
FIG. 19 illustrates another cross-sectional diagram along a direction B-B' in FIG. 8.

FIG. 19 illustrates another cross-sectional diagram along a direction B-B' in FIG. 8. Alternatively, as shown in FIG. 19, the touch electrode layer 03 includes a bridge structure 20 corresponding to each of the plurality of first sub-pixels 101. The bridge structure 20 is located in the corresponding third via hole 15 and is insulated from the touch electrode 2, and an orthographic projection of the bridge structure 20 on the plane of the display panel overlaps both the first via hole 13 and the second via hole 14.

In the present embodiment, the first via hole 13 and the third via hole 15 are deviated relative to the second via hole 14, which reduces a contact area between the pixel electrode 11 and the drain electrode 12. Therefore, in order to maintain a good electrical connection between the pixel electrode 11 and the drain electrode 12, a bridge structure 20 is arranged at the position of the third via hole 15, an upper surface of the bridge structure 20 contacts the pixel electrode 11, and a lower surface of the bridge structure 20 contacts the drain electrode 12. In this case, on the premise that the first via hole 13 and third via hole 15 are deviated relative to the second via hole 14, the pixel electrode 11 and the drain electrode 12 are electrically connected with each other by the bridge structure 20, thereby achieving good electrical connection between the pixel electrodes 11 and the drain electrode 12.

Optionally, as shown in FIG. 19, the touch electrode layer 03 includes a plurality of bridge structures 20 corresponding to the third via holes 15 in one-to-one correspondence. Each of the plurality of bridge structures 20 is located in the corresponding third via hole 15 and is insulated from the touch electrode 2. An orthographic projection of the bridge structure 20 on the plane of the display panel overlaps both the via hole 13 and the via hole 14.

In the present embodiment, in addition to a setting that a bridge structure is formed at a position corresponding to the first sub-pixel 101 whose corresponding via holes are deviated so as to achieve good electrical connection between the pixel electrode 11 and the drain electrode 12, the bridge structure is also provided at positions corresponding to other sub-pixels whose corresponding via holes are not deviated, so that the third via holes corresponding to the plurality of sub-pixels have more approximate resistances and the current on the touch electrodes is more uniform, thereby improving the display effect.

Optionally, as shown in FIG. 9, in the first via hole 13 and the second via hole 14 corresponding to the same first sub-pixel 101, a bottom area of the first via hole 13 overlaps a bottom area of the second via hole 14, and the bottom area of the second via hole 14 is an area of the second via hole 14 which exposes a part of the drain electrode 12.

When the bottom area of the first via hole 13 overlaps the bottom area of the second via hole 14, the bridge structure may not be provided. The pixel electrode 11 can contact with the drain electrode 12 directly through the first via hole 13 and the second via hole 14. For achieving a better electric structure, as shown in FIG. 19, the pixel electrode 11 and the drain electrode 12 is electrically connected with each other by the bridge structure 20.

Figure 20:
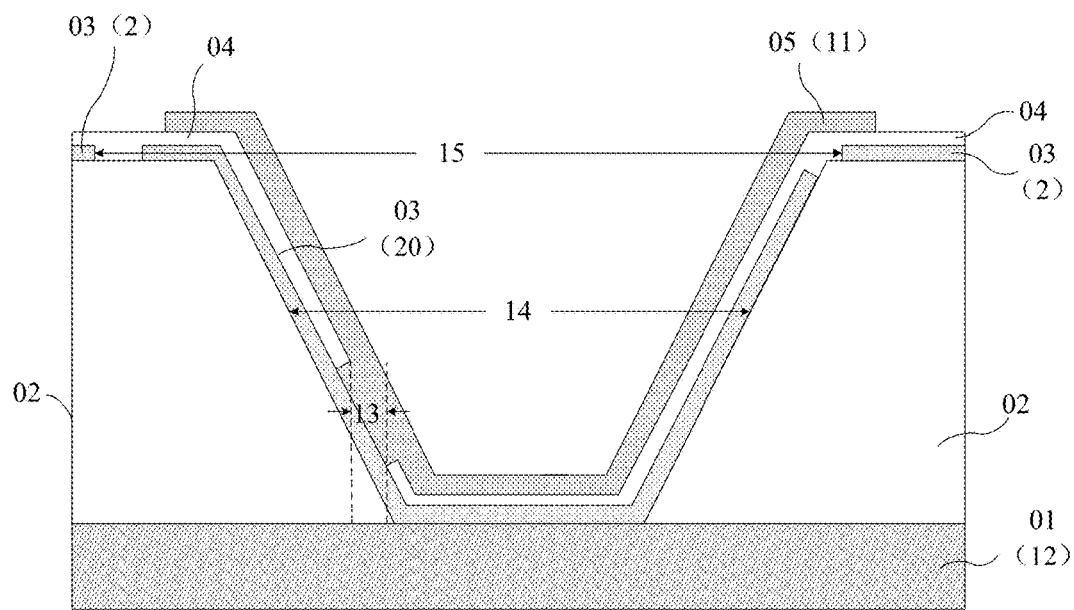
FIG. 20 illustrates another cross-sectional diagram along the direction B-B' in FIG. 8.

FIG. 20 illustrates another cross-sectional diagram along the direction B-B' in FIG. 8. Alternatively, as shown in FIG. 20, in the first via hole 13 and the second via hole 14 corresponding to the same first sub-pixel 101, the bottom area of the first via hole 13 does not overlap the bottom area of the second via hole 14. The bottom area of the second via hole 14 is an area of the second via hole 14 which exposes a part of the drain electrode 12.

When the bottom area of the first via hole 13 dose not overlap the bottom area of the second via hole 14, it is necessary to use the bridge structure 20 to realize the electrical connection between the pixel electrode 11 and the drain electrode 12.

Optionally, as shown in FIG. 7, 10, 15 or 17, in the remaining sub-pixels except all of the first sub-pixels 101, a distance between a center point of the first via hole 13 and a center point of the third via hole 15 in the first direction h1 is smaller than fpm, and a distance between a center point of the second via hole 14 and the center point of the third via hole 15 in the first direction h1 is smaller than 1 μm.

Considering process errors, when the distance between the center points of two via holes is smaller than 1 μm, it is defined that there is no deviation between the two via holes; and when the distance between the center points of two via holes is more than 1 μm, it is defined that there is deviation between the two via holes. A support post is arranged between two adjacent third via holes 15 in the first direction h1. As for each of the remaining sub-pixels except the first sub-pixels 101, center points of the corresponding first via hole 13, second via hole 14 and third via hole 15 are located at the same position so as to prevent the first via hole 13 and the third via hole 15 from being deviated to the position where the support post is located, thereby avoiding adversely influencing the supporting effect of the support post.

Optionally, as shown in FIGS. 12, 14, 15 and 17, at least a part of the plurality of sub-pixels 1 has different widths in the first direction h1.

When at least a part of the plurality of sub-pixels 1 has different widths in the first direction h1, there will be a relative deviation between edges of two sub-pixels adjacent to each other up-to-down. Therefore, embodiments of the present disclosure are applicable to the structures in which at least a part of the plurality of sub-pixels 1 has different widths in first direction h1.

Optionally, a plurality of sub-pixels 1 includes a plurality of color sub-pixels and a plurality of highlight sub-pixels. The plurality of color sub-pixels includes a red sub-pixel, a green sub-pixel, and a blue sub-pixel.

Optionally, each of the plurality of high-light sub-pixels has a width in the first direction is smaller than a width of each of the plurality of color sub-pixels in the first direction.

Since the highlight sub-pixels are used to enhance brightness, it is unnecessary to set a too large aperture rate for the highlight pixels. Therefore, a setting that the highlight sub-pixel has a width smaller than the width of the color sub-pixel will cause relative deviation between the edges of two sub-pixels adjacent to each other up-to-down. Therefore, embodiments of the present disclosure are applicable to the structures in which the width of each highlight sub-pixel is smaller than the width of each color sub-pixel in the first direction h1.

Figure 21:
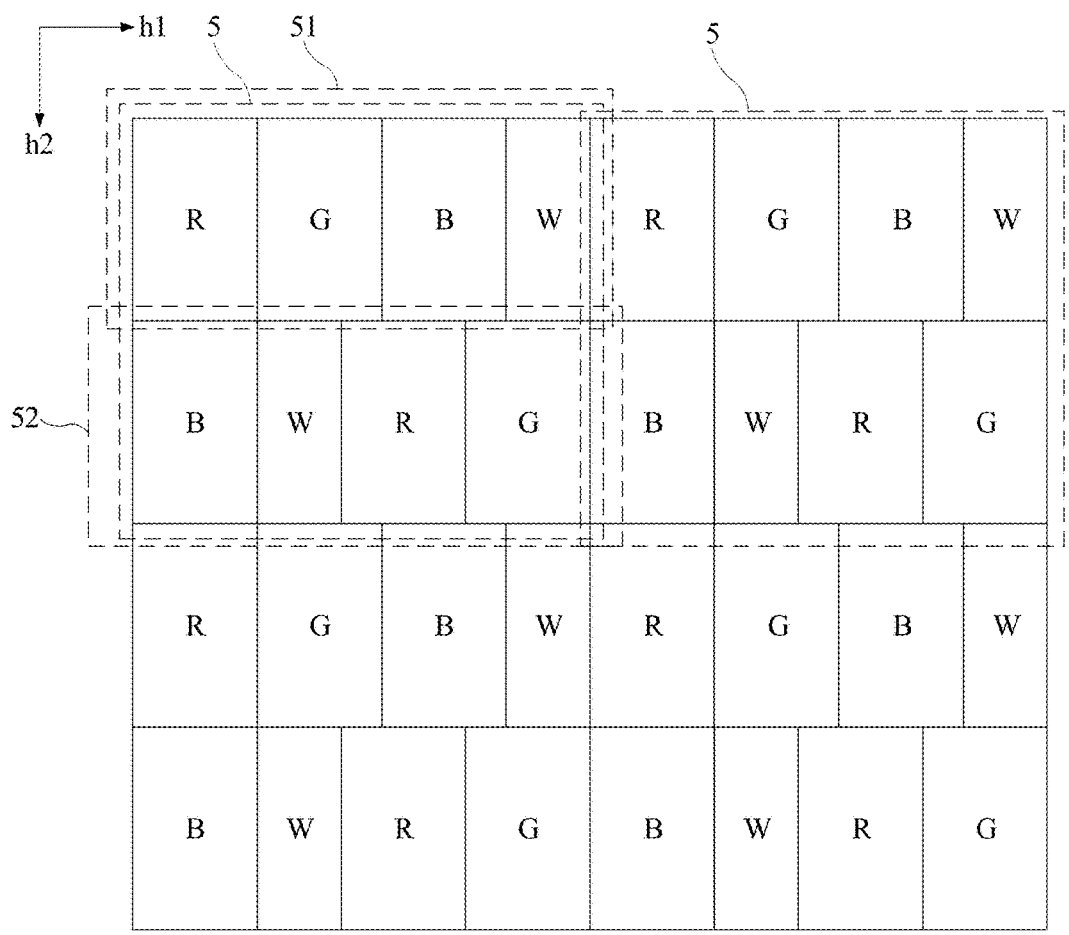
FIG. 21 illustrates a schematic diagram showing a pixel arrangement of a display panel according to an embodiment of the present disclosure.

FIG. 21 illustrates a schematic diagram showing a pixel arrangement of a display panel according to an embodiment of the present disclosure. Alternatively, as shown in FIG. 21, a plurality of sub pixels are divided into a plurality of repetitive units 5 arranged in an array. Each of the plurality of repetitive units 5 includes a first pixel 51 and a second pixel 52 arranged in the second direction h2. Each first pixel 51 includes a red sub-pixel R, a green sub-pixel G, a blue sub-pixel B, and a highlight sub-pixel W sequentially arranged in the first direction h1. Each second pixel 52 includes a blue sub-pixel B, a high-light sub-pixel W, a red sub-pixel R, and a green sub-pixel G arranged sequentially in the first direction h1.

Optionally, the red sub-pixel R, the green sub-pixel G, and the blue sub-pixel B have an identical width in the first direction h1.

Figure 22:
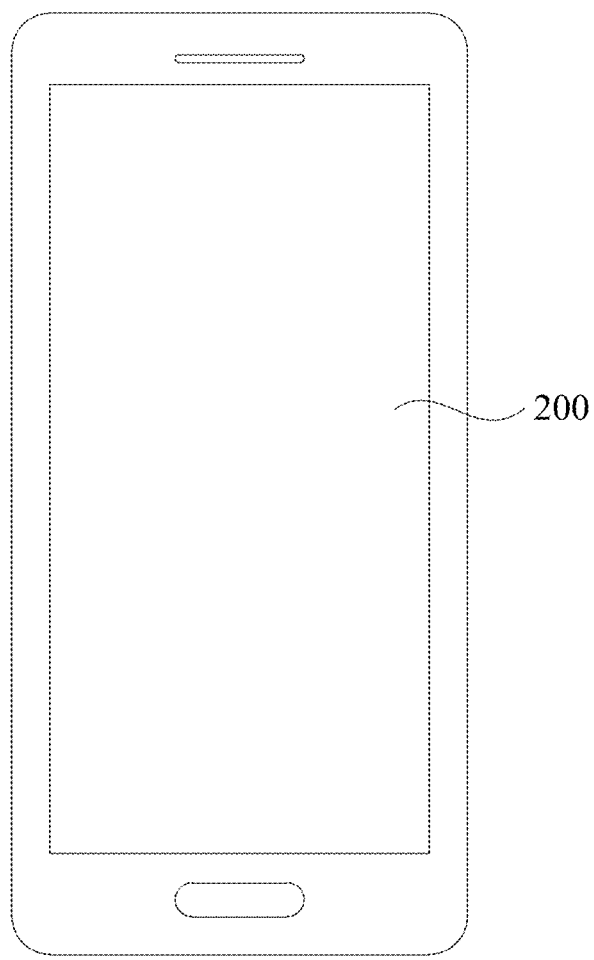
FIG. 22 illustrates a schematic diagram showing a structure of a display device structure according to an embodiment of the present disclosure.

FIG. 22 illustrates a schematic diagram showing a structure of a display device structure according to an embodiment of the present disclosure. As shown in FIG. 22, the embodiment of the present disclosure further provides a display device including a display panel 200 according to any of the previous embodiments of the present disclosure.

The specific structure and principles of the display panel 200 are the same as the previous embodiments and are not described again herein. The display device can be any electronic device that has a display function, such as a touch display screen, a mobile phone, a tablet computer, a laptop, an e-book or a television.

In the display device of the embodiment of the present disclosure, the first via hole and the third via hole adjacent to the edge of the touch electrode are deviated away from the edge of the touch electrode relative to the second via hole, thereby reducing the probability of disconnection of the touch electrode between the third via hole and the edge of the touch electrode and improving the display or touch effect.

The above are merely preferred embodiments of the present disclosure, which are not used to limit the present disclosure. Whatever within the principles of the present disclosure, including any modification, equivalent substitution, improvement, etc. shall fall into the protection scope of the present disclosure.

Finally, it should be noted that the above embodiments are merely used to illustrate technical solutions of the present disclosure, rather than to limit the present disclosure. Although the present disclosure is described in detail with reference to the above embodiments, those skilled in the art shall understand that it is still possible to modify the technical solutions described in the above embodiments or to replace some or all of the technical features thereof with equivalent ones, without departing from the essence and the protection scope of the technical solutions of the embodiments of the present disclosure

What is claimed is:

1. A display panel, comprising:
a plurality of sub-pixels arranged in an array, wherein the plurality of sub-pixels is defined by a plurality of scan lines and a plurality of data lines in a manner that the plurality of scan lines and the plurality of data lines intersect and are insulated from one another, wherein the plurality of scan lines extends in a first direction and is arranged in a second direction;
a pixel electrode layer comprising a pixel electrode corresponding to each of the plurality of sub-pixels;
a source-drain metal layer comprising a drain electrode corresponding to each of the plurality of sub-pixels;
an insulation layer comprising a first via hole corresponding to each of the plurality of sub-pixels;
a flat layer comprising a second via hole corresponding to each of the plurality of sub-pixels; and
a touch electrode layer comprising a plurality of touch electrodes arranged in an array, wherein an orthographic projection of each of the plurality of touch electrodes on a plane of the display panel overlaps more than one corresponding sub-pixels of the plurality of sub-pixels, each of the plurality of touch electrodes comprises a third via hole corresponding to and overlapping one first via hole, and an edge of each of the plurality of touch electrodes in the first direction is located between adjacent sub-pixels among the plurality of sub-pixels, the more than one sub-pixels comprise at least one first sub-pixel, and each of the at least one first sub-pixel is adjacent to an edge of the touch electrode in the first direction;
wherein the source-drain metal layer, the flat layer, the touch electrode layer, the insulation layer, and the pixel electrode layer are stacked sequentially in a direction perpendicular to the plane of the display panel; and
wherein as for the first via hole, the second via hole, and the third via hole corresponding to each first sub-pixel of the at least one first sub-pixel, a center point of the first via hole is deviated by more than 1 μm away from a first edge relative to a center point of the second via hole in the first direction, and a center point of the third via hole is deviated by more than 1 μm away from the first edge relative to the center point of the second via hole in the first direction, wherein the first edge is an edge of a touch electrode of the plurality of touch electrodes closest to said first sub-pixel in the first direction.

2. The display panel according to claim 1, further comprising a second sub-pixel corresponding to each first sub-pixel of the at least one first sub-pixel, wherein the first sub-pixel is adjacent to the corresponding second sub-pixel in the second direction,
the first sub-pixel has a second edge close to the first edge in the first direction,
the second sub-pixel has a third edge close to the first edge in the first direction, wherein the third edge is deviated by more than 1 μm away from the first edge relative to the second edge in the first direction, and
all of the first via hole, the second via hole, and the third via hole corresponding to a same first sub-pixel are located at a side of said same first sub-pixel close to the second sub-pixel corresponding to said same first sub-pixel.

3. The display panel according to claim 2, wherein each of the at least one first sub-pixel is adjacent to an edge of a corresponding touch electrode in the second direction, and all of the first via hole, the second via hole, and the third via hole corresponding to a same first sub-pixel are located at a side close to a fourth edge, wherein the fourth edge is an edge of the touch electrode closest to the same first sub-pixel in the second direction.

4. The display panel according to claim 2, wherein each of the plurality of touch electrodes has an aperture between each first sub-pixel of the at least one first sub-pixels and a corresponding second sub-pixel, the aperture extending from the third via hole to the first edge of the touch electrode.

5. The display panel according to claim 2, wherein at least a part of the plurality sub-pixels have different widths in the first direction.

6. The display panel according to claim 5, wherein the plurality of sub-pixels is divided into a plurality of repetitive units arranged in an array, wherein each of the plurality of repetitive units comprises a first pixel and a second pixel arranged sequentially along the second direction, wherein each first pixel comprises a red sub-pixel, a green sub-pixel, a blue sub-pixel, and a high-light sub-pixel arranged sequentially along the first direction, and each second pixel comprises a blue sub-pixel, a highlight sub-pixel, a red sub-pixel, and a green sub-pixel arranged sequentially along the first direction.

7. The display panel according to claim 1, wherein the touch electrode layer comprises a bridge structure corresponding to each of the at least one first sub-pixel, wherein the bridge structure is located in a third via hole corresponding to the each first sub-pixel and is insulated from the plurality of touch electrodes, and an orthographic projection of the bridge structure on the plane of the display panel overlaps both the first via hole and the second via hole corresponding to the each first sub-pixel.

8. The display panel according to claim 7, wherein as for the first via hole and the second via hole both corresponding to a same first sub-pixel, a bottom surface area of the first via hole overlaps a bottom surface area of the second via hole, wherein the bottom surface area of the second via hole is an area of the second via hole exposing part of a drain electrode corresponding to the same first sub-pixel.

9. The display panel according to claim 7, wherein as for the first via hole and the second via hole both corresponding to a same first sub-pixel, a bottom surface area of the first via hole does not overlap a bottom surface area of the second via hole, wherein the bottom surface area of the second via hole is an area of the second via hole exposing a part of a drain electrode corresponding to the same first sub-pixel.

10. The display panel according to claim 1, wherein the touch electrode layer comprises a bridge structure corresponding to each of the third via hole, wherein the bridge structure is located in the corresponding third via hole and is insulated from the plurality of touch electrodes, and an orthographic projection of the bridge structure on the plane of the display panel overlaps both the first via hole and the second via hole corresponding to the third via hole.

11. The display panel according to claim 10, wherein as for the first via hole and the second via hole both corresponding to a same first sub-pixel, a bottom surface area of the first via hole overlaps a bottom surface area of the second via hole, wherein the bottom surface area of the second via hole is an area of the second via hole exposing part of a drain electrode corresponding to the same first sub-pixel.

12. The display panel according to claim 10, wherein as for the first via hole and the second via hole both corresponding to a same first sub-pixel, a bottom surface area of the first via hole does not overlap a bottom surface area of the second via hole, wherein the bottom surface area of the second via hole is an area of the second via hole exposing a part of a drain electrode corresponding to the same first sub-pixel.

13. The display panel according to claim 12, wherein the plurality sub-pixels comprises a plurality of color sub-pixels and a plurality of highlight sub-pixels, and the plurality of color sub-pixels comprises a red sub-pixel, a green sub-pixel and a blue sub-pixel.

14. The display panel according to claim 13, wherein the red sub-pixel, the green sub-pixel, and the blue sub-pixel each have an identical width in the first direction.

15. The display panel according to claim 1, wherein as for a sub-pixel of the plurality of sub-pixels other than all first sub-pixels, a center point of a corresponding first via hole is deviated by a distance smaller than 1 µm away from a center point of a corresponding third via hole in the first direction, and a center point of a corresponding second via hole is deviated by a distance smaller than 1 µm away from the center point of the corresponding third via hole in the first direction.

16. The display panel according to claim 15, wherein each of the plurality of highlight sub-pixels has a width in the first direction smaller than a width of each of the plurality of color sub-pixels in the first direction.

17. A display device, comprising a display panel, wherein the display panel comprises:
- a plurality of sub-pixels arranged in an array, wherein the plurality of sub-pixels is defined by a plurality of scan lines and a plurality of data lines in a manner that the plurality of scan lines and the plurality of data lines intersect and are insulated from one another, wherein the plurality of scan lines extends in a first direction and is arranged in a second direction;
- a pixel electrode layer comprising a pixel electrode corresponding to each of the plurality of sub-pixels;
- a source-drain metal layer comprising a drain electrode corresponding to each of the plurality of sub-pixels;
- an insulation layer comprising a first via hole corresponding to each of the plurality of sub-pixels;
- a flat layer comprising a second via hole corresponding to each of the plurality of sub-pixels; and
- a touch electrode layer comprising a plurality of touch electrodes arranged in an array, wherein an orthographic projection of each of the plurality of touch electrodes on a plane of the display panel overlaps more than one corresponding sub-pixels of the plurality of sub-pixels, each of the plurality of touch electrode comprises a third via hole corresponding to and overlapping one first via hole, and an edge of each of the plurality of touch electrodes in the first direction is located between adjacent sub-pixels among the plurality of sub-pixels, the more than one sub-pixels comprise at least one first sub-pixel, and each of the at least one first sub-pixel is adjacent to an edge of the touch electrode in the first direction;

wherein the source-drain metal layer, the flat layer, the touch electrode layer, the insulation layer, and the pixel electrode layer are stacked sequentially in a direction perpendicular to the plane of the display panel; and wherein as for the first via hole, the second via hole, and the third via hole corresponding to each first sub-pixel of the at least one first sub-pixel, a center point of the first via hole is deviated by more than 1 µm away from a first edge relative to a center point of the second via hole in the first direction, and a center point of the third via hole is deviated by more than 1 µm away from the first edge relative to the center point of the second via hole in the first direction, wherein the first edge is an edge of a touch electrode of the plurality of touch electrodes closest to said first sub-pixel in the first direction.

* * * * *